(12) United States Patent
Wu

(10) Patent No.: US 12,526,120 B2
(45) Date of Patent: Jan. 13, 2026

(54) INFORMATION DETERMINATION METHOD AND APPARATUS, INFORMATION TRANSMISSION METHOD AND APPARATUS, DEVICE, AND STORAGE MEDIUM

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 340 days.

(21) Appl. No.: 18/216,070

(22) Filed: Jun. 29, 2023

(65) Prior Publication Data
US 2023/0353332 A1    Nov. 2, 2023

Related U.S. Application Data

(63) Continuation of application No. PCT/CN2020/141733, filed on Dec. 30, 2020.

(51) Int. Cl.
*H04L 5/00* (2006.01)
*H04W 48/16* (2009.01)
*H04W 74/0833* (2024.01)

(52) U.S. Cl.
CPC ........... *H04L 5/0094* (2013.01); *H04W 48/16* (2013.01); *H04W 74/0833* (2013.01)

(58) Field of Classification Search
CPC .. H04L 5/0094; H04W 48/16; H04W 74/0833
See application file for complete search history.

(56) References Cited

U.S. PATENT DOCUMENTS

| 2021/0084604 A1 | 3/2021 | Xu |
| 2022/0046726 A1* | 2/2022 | Taherzadeh Boroujeni ................ H04W 16/28 |
| 2022/0360481 A1* | 11/2022 | Xu ........................ H04L 5/0053 |
| 2023/0292269 A1 | 9/2023 | Liu |

FOREIGN PATENT DOCUMENTS

| CN | 109936430 A | | 6/2019 | |
| CN | 110839290 A | * | 2/2020 | ........... H04L 5/0007 |
| CN | 111527783 A | | 8/2020 | |
| CN | 111669235 A | | 9/2020 | |
| CN | 111836380 A | | 10/2020 | |
| CN | 112042239 A | | 12/2020 | |
| WO | 2019213955 A1 | | 11/2019 | |
| WO | 2019245199 A1 | | 12/2019 | |

OTHER PUBLICATIONS

Extended European Search Report issued in corresponding European application No. 20967616.2, mailed Feb. 8, 2024.
(Continued)

*Primary Examiner* — Duc C Ho
(74) *Attorney, Agent, or Firm* — BAYES PLLC

(57) ABSTRACT

Provided are an information determination method and apparatus. The information determination method includes: based on a first frequency range, determining information used by the terminal device in an initial access procedure.

18 Claims, 5 Drawing Sheets

Based on a first frequency range, determine information used by the terminal device in an initial access procedure — 410

(56) References Cited

OTHER PUBLICATIONS

Source: Charter Communications; Title: On Initial Access Procedure Aspects 3GPP TSG RAN WG1 Meeting #98BIS R1-1910441 Chongqing, P.R. China, Oct. 14-20, 2019.
International Search Report issued in international application No. PCT/CN2020/141733, mailed Sep. 8, 2021.
Written Opinion of the International Searching Authority issued in international application No. PCT/CN2020/141733, mailed Sep. 8, 2021.
Intel Corporation, "Presentation of Report to TSG: TR 38.808 v100: Study on supporting NR from 52.6 GHz to 71 GHz", RP-202254, 3GPP TSG-RAN Meeting #90-e e-Meeting, Dec. 7-11, 2020.
3GPP TR 38.808 V1.0.0 (Dec. 2020); Technical Specification Group Radio Access Network; Study on supporting NR from 52.6 GHz to 71 GHz (Release 17).
3GPP TR 21.905 V16.0.0 (Jun. 2019); Technical Specification Group Services and System Aspects; Vocabulary for 3GPP Specifications (Release 16).
Communication pursuant to Article 94(3) EPC issued in corresponding European Application No. 20967616.2, mailed on Jan. 27, 2025, 5 pages.
Summons to attend oral proceedings pursuant to Rule 115(1) EPC issued in corresponding European Application No. 20967616.2, mailed Sep. 8, 2025, 8 pages.
"Enhancements to Initial access procedure for NR-U", Agenda Item: 7.2.2.2.2, Source: OPPO, 3GPP TSG RAN WG1 #99, R1-1912507, Reno, USA, Nov. 18-22, 2019, 8 pages.

* cited by examiner

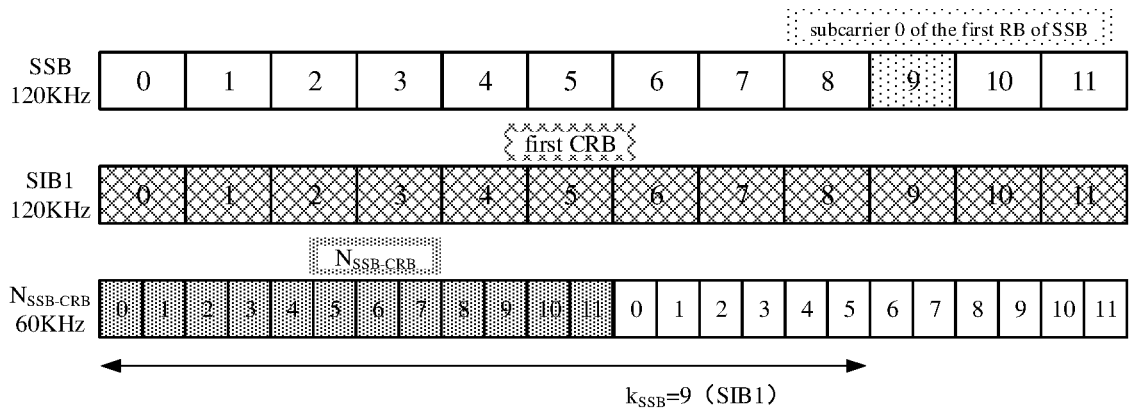
FIG. 3
Based on a first frequency range, determine information used by the terminal device in an initial access procedure  —410
FIG. 4
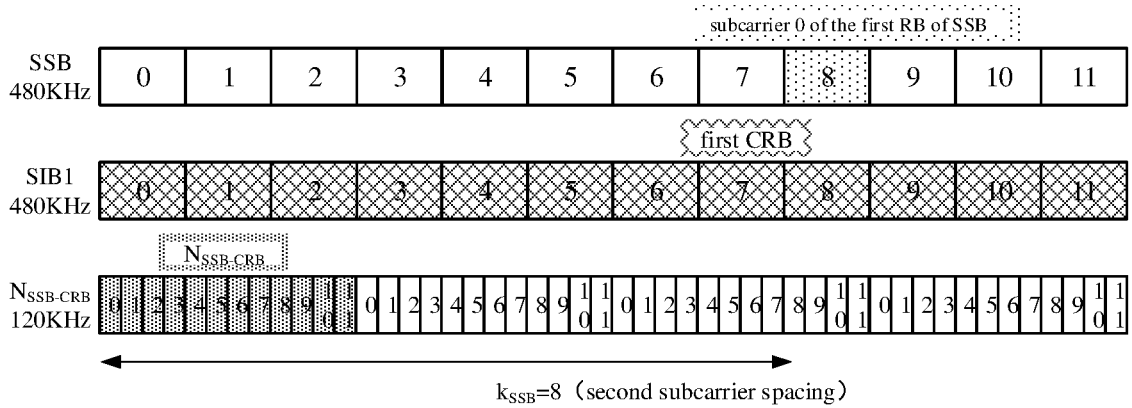
FIG. 5

INFORMATION DETERMINATION METHOD AND APPARATUS, INFORMATION TRANSMISSION METHOD AND APPARATUS, DEVICE, AND STORAGE MEDIUM

CROSS-REFERENCE TO RELATED APPLICATION

This application is a continuation of International Application No. PCT/CN2020/141733, filed on Dec. 30, 2020, which is incorporated herein by reference in its entirety.

TECHNICAL FIELD

Embodiments of the present disclosure relate to the communication technical field, and more specifically, to an information determination method, an information transmission method, an apparatus, a device and a storage medium.

BACKGROUND

The studies of the New Radio (NR) system currently mainly consider two frequency ranges: Frequency Range 1 (FR1) and Frequency Range 2 (FR2). A frequency included in FR1 is smaller than a frequency included in FR2.

With the evolution of the NR system, studies of technologies on a new frequency range (referred to as "high frequency" in embodiments of the present disclosure) are also started. When the NR system is deployed at a high frequency, the high frequency includes both an unlicensed spectrum (shared spectrum) and a licensed spectrum (unshared spectrum). SSB (Synchronization Signal/PBCH (Physical Broadcast Channel) Block) transmission on the licensed spectrum may not require multiple candidate positions, while SSB transmission on the unlicensed spectrum may require multiple candidate positions so that a network device may, after Listen Before Talk (LBT) succeeds, perform SSB transmission at at least one candidate position among the multiple candidate positions. In addition, SSB transmission or System Information Block 1 (SIB1) transmission in a high frequency may introduce new subcarrier spacing (SCS), or may introduce more SSB numbers in the high frequency, for example, 128 SSBs.

Therefore, in a high frequency, how to determine the meaning of information transmitted in the PBCH, or how to determine information used in an initial access procedure, needs further discussions and researches.

SUMMARY

Embodiments of the present disclosure provide an information determination method, an information transmission method, an apparatus, a device, and a storage medium. The technical solutions are as follows:

In an aspect, an embodiment of the present disclosure provides an information determination method, the method including:
  based on a first frequency range, determining information used by the terminal device in an initial access procedure.

In another aspect, an embodiment of the present disclosure provides an information transmission method, the method including:
  sending a first Synchronization Signal Block (SSB) to a terminal device via a first frequency band, wherein the first frequency band belongs to a first frequency range.

In another aspect, an embodiment of the present disclosure provides an information determination apparatus, the apparatus including:
  an information determination module configured to, based on a first frequency range, determine information used by the terminal device in an initial access procedure.

In another aspect, an embodiment of the present disclosure provides an information transmission apparatus, the apparatus including:
  a first sending module configured to send a first Synchronization Signal Block (SSB) to a terminal device via a first frequency band, wherein the first frequency band belongs to a first frequency range.

In another aspect, an embodiment of the present disclosure provides a terminal device. where the terminal device includes: a processor and a transceiver connected to the processor; wherein:
  the processor is configured to, based on a first frequency range, determine information used by the terminal device in an initial access procedure.

In another aspect, an embodiment of the present disclosure provides a network device, where the network device includes: a processor and a transceiver connected to the processor; wherein:
  the transceiver is configured to send a first Synchronization Signal Block (SSB) to a terminal device via a first frequency band, wherein the first frequency band belongs to a first frequency range.

In another aspect, an embodiment of the present disclosure provides a computer-readable storage medium, where a computer program is stored in the storage medium, and the computer program is used to be executed by a processor of a terminal device, so as to implement the information determination method described above.

In another aspect, an embodiment of the present disclosure provides a computer-readable storage medium, where a computer program is stored in the storage medium, and the computer program is used to be executed by a processor of a network device, so as to implement the above information transmission method.

In another aspect, an embodiment of the present disclosure provides a chip, the chip includes a programmable logic circuit and/or program instructions, and when the chip is run on a terminal device, the above information determination method is performed.

In another aspect, an embodiment of the present disclosure provides a chip, the chip includes a programmable logic circuit and/or program instructions, and when the chip is run on a network device, the above information transmission method is performed.

In another aspect, an embodiment of the present disclosure provides a computer program product. When the computer program product is run on a terminal device, the above information determination method is performed.

In another aspect, an embodiment of the present disclosure provides a computer program product. When the computer program product is run on a network device, the above information transmission method is performed.

The technical solutions provided by the embodiments of the present disclosure may include the following beneficial effects:

By designing the information transmission in the PBCH on a high frequency band, during the initial access procedure, the network device sends information such as SSB or SIB1 to the terminal device based on the high frequency band, so that the terminal device, based on the high frequency band, the received SSB and PBCH, determines information used in the initial access procedure, such as, determining the subcarrier spacing corresponding to SSB transmission, the subcarrier spacing corresponding to SIB1 transmission, subcarrier offset indication information, QCL hypothesis indication information, etc., and thus the terminal device subsequently uses the information to access a cell where the network device resides to realize information interaction and data transmission with the network device through the high frequency band.

BRIEF DESCRIPTION OF THE DRAWINGS

In order to more clearly illustrate the technical solutions in the embodiments of the present disclosure, the drawings that need to be used in the description of the embodiments will be briefly introduced below. Obviously, the drawings in the following description are only some embodiments of the present disclosure. For those skilled in the art, other drawings can also be obtained based on these drawings without creative effort.

FIG. 3 is a schematic diagram of $k_{SSB}$ indication provided by another embodiment of the present disclosure;

FIG. 4 is a flowchart of an information determination method provided by an embodiment of the present disclosure;

FIG. 5 is a schematic diagram of $k_{SSB}$ indication provided by another embodiment of the present disclosure;

DETAILED DESCRIPTION

Figure 1:
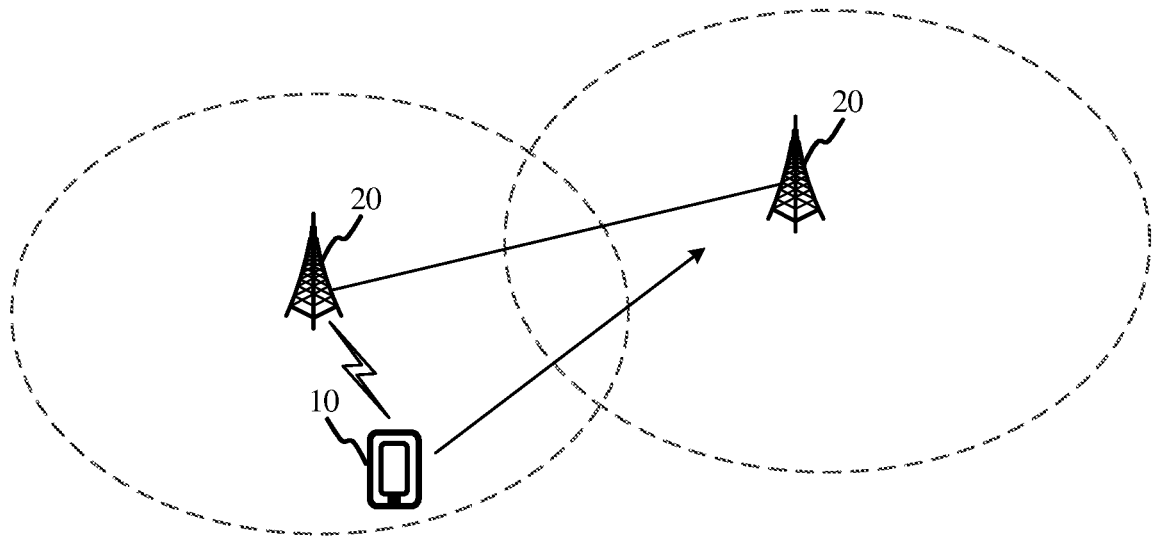
FIG. 1 is a schematic diagram of a system architecture provided by an embodiment of the present disclosure.

In order to make the purposes, technical solutions and advantages of the present disclosure clearer, the implementation s of the present disclosure will be further described in detail below in conjunction with the accompanying drawings.

The network architecture and service scenarios described in the embodiments of the present disclosure are for more clearly illustrating the technical solutions of the embodiments of the present disclosure, and do not constitute limitations on the technical solutions provided by the embodiments of the present disclosure. One of ordinary skill in this art will understand that, as the evolution of network architecture and the emergence of new service scenarios, the technical solutions provided in the embodiments of the present disclosure are also applicable to similar technical problems.

The technical solutions according to embodiments of the present disclosure may be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunication System (UMTS), Wireless Local Area Networks (WLAN), Wireless Fidelity (WiFi), 5th-Generation (5G) system, or other communication systems, etc.

Generally speaking, traditional communication systems support a limited number of connections and are easy to implement. However, with the development of communication technologies, mobile communication systems will not only support traditional communications, but also support, for example, Device to Device (Device to Device, D2D) communications, Machine to Machine (M2M) communications, Machine Type Communication (MTC), Vehicle to Vehicle (V2V) communications, or Vehicle to everything (V2X), etc. Embodiments of the present disclosure can be applied to these communications systems.

Optionally, the communication systems in embodiments of the present disclosure may be applied to a Carrier Aggregation (CA) scenario, may also be applied to a Dual Connectivity (DC) scenario, or can also be applied to a standalone (SA) network deployment scenario.

Optionally, the communication system in embodiments of the present disclosure may be applied in unlicensed spectrum. The unlicensed spectrum may also be considered as shared spectrum. Or, the communication system in embodiments of the present disclosure may also be applied in licensed spectrum. The licensed spectrum may also be considered as non-shared spectrum.

Embodiments of the present disclosure are described in combination with a terminal device and a network device. The terminal device may also be called User Equipment (UE), access terminal, user unit, user station, mobile station, mobile terminal, remote station, remote terminal, mobile device, user terminal, terminal, wireless communication device, user agent or user device, etc.

The terminal device may be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

In embodiments of the present disclosure, the terminal device may be deployed on land, including indoor or outdoor, handheld, wearable or vehicle-mounted; or, the terminal device may be deployed on water (such as on ships, etc.); or, the terminal device may be deployed in the air (such as on aircraft, balloons, and satellites, etc.).

In embodiments of the present disclosure, the terminal device may be a mobile phone, a tablet computer (Pad), a computer with wireless transceiver function, a virtual reality (VR) terminal device, an augmented reality (AR) terminal device, a wireless terminal device in industrial control, a wireless terminal device in self driving, a wireless terminal devices in remote medical, a wireless terminal device in smart grid, a wireless terminal device in transportation safety, a wireless terminal device in smart city, or a wireless terminal device in smart home, etc.

By way of example and not limitation, in embodiments of the present disclosure, the terminal device may also be a wearable device. The wearable device can also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

In embodiments of the present disclosure, the network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB,), or a relay station or an access point, or a vehicle-mounted device, a wearable device, a network device or a base station (gNB) in an NR network, or a network device in future evolved PLMN network or a network device in a NTN network.

By way of example and not limitation, in embodiments of the present disclosure, the network device may have mobile characteristics, for example, the network device may be a mobile device. Optionally, the network device may be a satellite, or a balloon station. For example, the satellite may be a Low Earth Orbit (LEO) satellite, a Medium Earth Orbit (MEO) satellite, a Geostationary Earth Orbit (GEO) satellite, or a High Elliptical Orbit (HEO) satellite, etc. Optionally, the network device may also be a base station deployed on land, or water, etc.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

It should be understood that the terms "system" and "network" are often used interchangeably herein. The term "and/or" herein is just an association relationship describing associated objects, which means that there may be three kinds of relationships, for example, A and/or B may mean: A alone, B alone, and A and B together. In addition, the character "/" herein generally indicates that the associated objects before and after "/" are an "or" relationship.

The terms used in the embodiments of the present disclosure are only used to explain example embodiments of the present disclosure, and are not intended to limit the present disclosure. The terms "first", "second" and the like in the description and claims of the present disclosure and the drawings are used to distinguish different objects, rather than describing a specific order. Furthermore, the terms "include" and "have", as well as any variations thereof, are intended to cover a non-exclusive inclusion.

It should be understood that the "indication/indicate" mentioned in the embodiments of the present disclosure may be a direct indication, or may be an indirect indication, or may mean that there is an association relationship. For example, A indicates B, which may mean that A directly indicates B, for example, B may be obtained through A; it may also indicate that A indirectly indicates B, for example, A indicates C, and B may be obtained through C; it may also indicate that there is an association relationship between A and B.

In the description of the embodiments of the present disclosure, the term "corresponding/correspond" may indicate that there is a direct or indirect correspondence between two things, or that there is an association relationship between the two, or that the two are in a relationship of indicating and being indicated, or a relationship of configuring and being configured, etc.

Optionally, in embodiments of the present disclosure, "predefine/predefinition" may be realized by pre-saving a corresponding code, table or other methods that can be used to indicate related information in a device (for example, including a terminal device and a network device). The present disclosure does not limit its specific implementation. For example, the "predefine/predefinition" may refer to being defined in a protocol.

Optionally, in embodiments of the present disclosure, a "protocol" may refer to a standard or a protocol in the communication field, for example, it may include an LTE protocol, an NR protocol, and related protocols applied to future communication systems, and the present disclosure does not impose any limitation on this.

FIG. 1 shows a schematic diagram of a system architecture provided by an embodiment of the present disclosure. The system architecture may include: at least one terminal device 10 and at least one network device 20.

The number of at least one terminal device 10 is generally multiple, and one or more terminal devices 10 may be distributed in a cell managed by each network device 20. The at least one terminal device 10 may include various handheld devices with wireless communication functions, vehicle-mounted devices, wearable devices, computing devices or other processing devices connected to a wireless modem, as well as various forms of User Equipment (UE), Mobile Station (MS) and so on. For convenience of description, in the embodiments of the present disclosure, the above-mentioned devices are collectively referred to as a terminal device.

The network device 20 is a device deployed in an access network to provide a wireless communication function for the at least one terminal device 10. The network device 20 may include various forms of macro base stations, micro base stations, relay stations, access points and so on. In systems using different radio access technologies, the names of devices with the network device function may be different. For example, in 5G (5th-Generation, fifth-generation mobile communication technology) NR system or NR-U (New Radio-Unlicensed, new radio of unlicensed carrier) system, such device is called a gNodeB or gNB. The term "network device" may change as communications technologies evolve. For the convenience of description, in the embodiment of the present disclosure, the above-mentioned devices that provide the wireless communication functions for at least one terminal device 10 are collectively referred to as a network device.

The "5G NR system" in the embodiment of the present disclosure may also be called a 5G system or an NR system, and those skilled in the art can understand its meaning. The technical solutions described in the embodiments of the present disclosure may be applied to the 5G NR system or the NR-U system, and may also be applied to a subsequent evolution system of the 5G NR system or the NR-U system.

Before introducing and explaining the technical solutions of the embodiments of the present disclosure, some terms and related technologies appearing in the embodiments of the present disclosure are firstly introduced.

I. High Frequency

The researches of NR system mainly consider two frequency ranges at present: FR1 and FR2. The frequency ranges included in FR1 and FR2 are shown in Table 1 below.

TABLE I

Definition of frequency range

| name | Frequency Range |
| --- | --- |
| FR1 | 410 MHz (megahertz) to 7.125 GHz |
| FR2 | 24.25 GHz to 52.6 GHz |

With the evolution of the NR system, the studies of technologies on a new frequency range (referred to as "high frequency" in the embodiments of the present disclosure) are also started. The frequency range included in the high frequency is shown in Table 2 below. For the convenience of description, as shown in the following Table 2, FRX (Frequency Range X) is also used in the embodiments of the present disclosure to represent high frequency. It should be understood that this name should not constitute any limitation. For example, high frequency may also be represented as FR3 (Frequency Range 3).

TABLE 2

Frequency range included in high frequency

| name | Frequency Range |
| --- | --- |
| FRX | 52.6 GHz to 71 GHz |

FRX includes both licensed and unlicensed spectrum. In other words, FRX includes both non-shared spectrum and shared spectrum.

The unlicensed spectrum is the spectrum allocated by relevant organizations that can be used for radio equipment communications. This spectrum is usually considered a shared spectrum, that is, communication devices in different communication systems may use the spectrum as long as they meet regulatory requirements set by relevant organizations on this spectrum, and there is no need to apply to relevant organizations for exclusive spectrum authorization.

In order to allow various communication systems that use the unlicensed spectrum for wireless communications to coexist friendly on this spectrum, some organizations stipulate the regulatory requirements that must be met when using the unlicensed spectrum. For example, a communication device follows a principle of "listen before talk", that is, before the communication device transmits a signal on a channel of the unlicensed spectrum, it needs to perform channel listening first, and only when the channel listening result shows that the channel is idle, the communication device can carry out signal transmission; if the channel listening result of the communication device on the channel of the unlicensed spectrum shows that the channel is busy, the communication device cannot perform signal transmission. For another example, in order to ensure fairness, in one transmission, the duration of signal transmission by the communication device using the channel of the unlicensed spectrum cannot exceed a certain period of time. For another example, in order to prevent the power of the signal transmitted on the channel of the unlicensed spectrum from being too large and affecting transmission of other important signals on the channel, the communication device needs not to exceed the maximum power spectrum density limitation when using the channel of the unlicensed spectrum for signal transmission.

The subcarrier spacing considered by FRX may be larger than that of FR2. In one example, the candidate subcarrier spacing includes at least one of the following: 240 KHz, 480 KHz, and 960 KHz. Optionally, the corresponding numerology under the candidate subcarrier spacing is shown in Table 3 below.

TABLE 3

Numerology corresponding to the candidate subcarrier spacing

| subcarrier spacing | symbol length | NCP length | ECP length | symbol of NCP length | slot length |
| --- | --- | --- | --- | --- | --- |
| 240 KHz | 4.16 μs | 0.292 μs | 1.04 μs | 4.452 μs | 62.5 μs |
| 480 KHz | 2.08 μs | 0.146 μs | 0.52 μs | 2.226 μs | 31.25 μs |
| 960 KHz | 1.04 μs | 0.073 μs | 0.26 μs | 1.113 μs | 15.625 μs |

II. SSB Transmission in NR System

1. SSB Index Indication

In the NR system, one SSB burst set may include one or more SSBs, where one SSB includes 4 symbols in the time domain. A SSB burst set should be transmitted within a half frame (5 ms (milliseconds)).

For FR1, there are at most 8 SSBs in an SSB burst set, and a maximum of 3 bits are required to indicate the indexes of these 8 SSBs. These 3 bits are carried implicitly through a Demodulation Reference Signal (DMRS) sequence of a PBCH. There are altogether 8 different DMRS sequences of the PBCH, corresponding to 8 different SSB indexes, respectively.

For FR2, since FR2 includes a higher frequency than FR1, in order to ensure long-distance signal transmission, its beam energy needs to be more concentrated. Correspondingly, the coverage angle of a single beam will be smaller, and more beams need to be used to ensure the coverage of a cell. Optionally, a maximum of 64 SSBs may be configured in FR2, and 6 bits need to be used to indicate the indexes of these 64 SSBs. The lower 3 bits of the 6 bits are still carried by the DMRS sequence of the PBCH, and the additional upper 3 bits are directly indicated through the payload of the PBCH.

2. Indication of an Index of an SSB Actually Transmitted in a SSB Burst Set

For FR1, a network device indicates an index of an actually transmitted SSB by using a complete bitmap. One bit in the bitmap corresponds to an SSB index. If the value of this bit is "1", it means that the network device has sent the SSB. If the value of the bit is "0", indicating that the network device does not send the SSB.

For FR2, when the network device indicates an index of a transmitted SSB through SIB1, for example, when the network device provides corresponding configuration information through ssb-PositionsInBurst in SIB1, in order to save signaling overhead, transmission candidate positions of SSBs are grouped, and the network device indicates, based on a group bitmap, a group in which there is actual SSB transmission, and indicates the position of the actually transmitted SSB in each group in which there is actual SSB transmission based on an in-group bitmap. The position(s) of the actually transmitted SSB(s) in each group is(are) the same. Optionally, 64 SSB candidate positions are divided into 8 groups, and each group includes 8 SSBs, and a total of 8 bits are needed to be used to indicate the group(s). Other 8 bitmaps indicate the position where an SSB is sent in each group. Thus, this method requires a total of 16 indicator bits.

As an example, assuming that the group bitmap (such as groupPresence) is "11000000", it means that the SSB(s) in 0th group of SSBs (SSB indexes 0 to 7) and $1^{st}$ group of SSBs (SSB indexes 8 to 15) are transmitted based on indication of the in-group bitmap. Assuming that the in-group bitmap (for example, inOneGroup) indicates "11001100", it further indicates that there are SSB transmissions at the 0th, 1st, 4th, and 5th SSB transmission candidate positions in the 0th group of SSBs and the 0th, 1st, 4th and 5th SSB transmission candidate positions in the 1sst group of SSBs. That is to say, in this example, the SSB indexes transmitted by the network device are SSB0, SSB1, SSB4, SSB5, SSB8, SSB9, SSB12, and SSB13. When the network device indicates the transmitted SSBs through the configuration information of the serving cell (for example, the corresponding configuration information is provided through ssb-PositionsInBurst in ServingCellConfigCommon), the complete bitmap is used, that is, 64 bits are used to indicate the transmitted SSB indexes.

The terminal device should expect the configuration information provided by ssb-PositionsInBurst in ServingCellConfigCommon to be the same as the configuration information provided by ssb-PositionsInBurst in SIB1.

3. Quasi Co Location (QCL) Relationship of SSB

A main function of an SSB index is to allow a terminal device to obtain system timing information. In addition, the SSB index has another function, which is used to indicate a QCL relationship between SSBs. The QCL relationship between signals is used to describe the similarity of their large-scale parameter features. If there is a QCL relationship between two signals, the large-scale parameters of the two signals may be considered similar. For SSB, SSBs carried by different beams in the 5G NR system constitutes an SSB burst set, and different SSB indexes correspond to different SSB time domain position information in the burst set, and also correspond to specific SSB transmission beam information. SSBs with the same SSB index may be considered to have a QCL relationship, and the terminal device may assume that the network device uses the same beam to transmit these SSBs. There is no QCL relationship between SSBs corresponding to different SSB indexes, because they may come from different transmit beams of the network device, and may experience different channel transmission characteristics.

III. SSB Transmission in NR-U System

1. Discovery Signal Transmission Opportunity Window

The NR-U system may be considered as a system deployed on the unlicensed spectrum of FR1. In the NR-U system, the initial access procedure of a terminal device may be completed by detecting a SSB burst set in a discovery signal transmission opportunity (Discovery Burst) window. In an example, the discovery signal transmission opportunity window occurs periodically, and the length of the discovery signal transmission opportunity window may be configured by the network device. For example, for a serving cell, the terminal device may determine the length of the discovery signal transmission opportunity window through indication information of the network device (for example, DiscoveryBurst-WindowLength-r16). Optionally, the length of the discovery signal transmission opportunity window indicated by the indication information may be 0.5 ms, 1ms, 2 ms, 3 ms, 4 ms or 5 ms. Optionally, if the terminal device is not configured with the length of the discovery signal transmission opportunity window by the network device, for example, the terminal device is not provided with the DiscoveryBurst-WindowLength-r16 indication information, the terminal device may assume that the length of the discovery signal transmission opportunity window is one half frame, that is, 5 ms.

2. Candidate SSB Index

The SSB burst set in the discovery signal transmission opportunity window may include one or more candidate positions for SSB transmission, and each candidate position for SSB transmission corresponds to a candidate SSB index. When sending a SSB within the discovery signal transmission opportunity window, the network device may perform multiple LBT attempts, and may perform SSB transmission through at least one candidate position among the plurality of candidate positions after the LBT is successful. In different discovery signal transmission opportunity windows, the network device may select a candidate position, where channel use right is obtained, from the SSB candidate positions in the discovery signal transmission opportunity windows according to the LBT result(s) to perform SSB transmission.

For FR1, one slot may include 2 candidate SSB positions, and the index of a SSB transmitted in a candidate SSB position may be considered as a candidate SSB index. The maximum number of candidate SSB positions that may be included in one half frame (5 ms) is related to subcarrier spacing. Exemplarily, if the subcarrier spacing of SSB is 15 KHz, the maximum number of candidate SSB positions is 10, and within the half-frame, the candidate SSB indexes sent at the candidate SSB positions are respectively 0 to 9 in the time domain. If the subcarrier spacing of SSB is 30 KHz, then the maximum number of candidate SSB positions is 20, and within the half-frame, the candidate SSB indexes sent at the candidate SSB positions are respectively 0 to 19 in the time domain. The half frame may be the first half frame (the first 5 ms) or the second half frame (the last 5 ms) of a radio frame.

3. QCL Relationship of SSBs in NR-U

A terminal device may determine a candidate SSB position with the same QCL hypothesis according to the QCL hypothesis indication information (referred to as "Q" in the embodiments of the present disclosure), or the terminal device may determine a SSB index according to Q. The Q may be indicated by the network device or may be preset. Q is used to indicate the maximum number of SSBs that a network device may send within a discovery signal transmission opportunity window, or in other words, Q is used to determine an SSB index. The value of Q may be 1, 2, 4 or 8. SSB index=(candidate SSB index mod Q), or, SSB index=(DMRS sequence index of PBCH mod Q). For example, if the value of Q is 4, and the candidate SSB index of the SSB transmitted at the candidate SSB position 10 is 10, it may be considered that the SSB index of the SSB transmitted at the candidate SSB position 10 is (10 mod 4)=2.

Optionally, SSBs with the same SSB index may be considered to have a QCL relationship, and the UE may assume that the network device uses the same beam for transmitting these SSBs; there is no QCL relationship between SSBs corresponding to different SSB indexes, because they may come from different transmit beams of the network device, and may experience different channel transmission characteristics.

4. Indication of an Index of an SSB Actually Transmitted in the Discovery Signal Transmission Opportunity Window A terminal may determine an actually sent SSB through indication information of the network device (for example, ssb-PositionsInBurst). The indication information corresponds to a bitmap, where the first bit in the bitmap corresponds to SSB index 0, the second bit in the bitmap corresponds to SSB index 1, and so on. In an example, if the bit is 0, it is used to indicate that the SSB corresponding to the bit is not transmitted; and if the bit is 1, it is used to indicate that the SSB corresponding to the bit is transmitted. Optionally, the length of the bitmap corresponding to the indication information (for example, ssb-PositionsInBurst) is 8. Optionally, the terminal device may assume that a bit position greater than Q in the bitmap is 0.

For example, assuming that the bitmap corresponding to ssb-PositionsInBurst on a serving cell is [10100000], and the value of Q is 4, then the SSB indexes sent on the serving cell are SSB0 and SSB2.

If the subcarrier spacing of SSB is 30 KHz, the length of the discovery signal transmission opportunity window is 5 ms, and the candidate SSB indexes corresponding to the candidate SSB positions included in the discovery signal transmission opportunity window are 0 to 19, the candidate SSB indexes corresponding to the candidate SSB positions that may be used for SSB transmission are 0, 2, 4, 6, 8, 10, 12, 14, 16, and 18, respectively. The network device may select a candidate SSB position for actual SSB transmission from the candidate SSB positions according to a LBT result. The SSB index of the SSBs transmitted on the candidate SSB positions corresponding to the candidate SSB indexes of 0, 4, 8, 12, 16 is 0, that is, these SSBs have a QCL relationship. The SSB index of the SSBs transmitted on the candidate SSB positions corresponding to the candidate SSB indexes of 2, 6, 10, 14, 18 is 2, that is, these SSBs have a QCL relationship. The candidate SSB positions corresponding to the candidate SSB indexes of 1, 3, 5, 7, 9, 11, 13, 15, 17, 19 are not used for SSB transmission.

If the subcarrier spacing of SSB is 15 KHz, the length of the discovery signal transmission opportunity window is 5 ms, and the candidate SSB indexes corresponding to the candidate SSB positions included in the discovery signal transmission opportunity window are 0 to 9, the candidate SSB indexes corresponding to candidate SSB positions that may be used for SSB transmission are 0, 2, 4, 6, and 8, respectively. The network device may select a candidate SSB position for actual SSB transmission from the candidate SSB positions according to a LBT result. The SSB index of the SSBs transmitted on the candidate SSB positions corresponding to the candidate SSB indexes of 0, 4, and 8 is 0, that is, these SSBs have a QCL relationship. The SSB index of the SSBs transmitted on the candidate SSB positions corresponding to the candidate SSB indexes of 2 and 6 is 2, that is, these SSBs have a QCL relationship. The candidate SSB positions corresponding to the candidate SSB indexes of 1, 3, 5, 7, 9 are not used for SSB transmission.

The terminal device should expect the configuration information provided by ssb-PositionsInBurst in ServingCell-ConfigCommon to be the same as the configuration information provided by ssb-PositionsInBurst in SIB1.

IV. Information Carried by PBCH

1. Information Carried by PBCH in NR System

In the NR system, the information carried by the PBCH includes Master Information Block (MIB) information, MIB message type indication information, and PBCH information. The information included in the MIB is shown in Table 4 below, with a total of 23 bits, plus 1 bit of MIB message type indication, that is, the message generated by the higher layer includes A=24 bits. The A-bit information is the first A-bit information carried in the PBCH, denoted as $a_0, a_1, \ldots, a_{A-1}$.

TABLE 4

| MIB information | number of bits |
| --- | --- |
| System Frame Number (SFN) | 6 |
| common subcarrier spacing (subCarrierSpacingCommon) | 1 |
| SSB subcarrier offset ($k_{SSB}$) | 4 |
| TypeA DMRS position | 1 |
| SIB1 PDCCH (Physical Downlink Control Channel) configuration | 8 |
| Cell Barred (cellBarred) | 1 |
| Intra-frequency reselection (intraFreqReselection) | 1 |
| spare bit (spare) | 1 |
| total | 23 |

In addition, the physical layer additionally generates 8-bit PBCH information, denoted as $a_A, a_{A+1}, \ldots, a_{A+7}$. That is to say, without counting the Cyclic Redundancy Check (CRC), the PBCH includes a total of 32 information bits. Among them, $a_A$, $a_{A+1}$, $a_{A+2}$, and $a_{A+3}$ are used to represent the 4th, 3rd, 2nd, and 1st low order bits (least significant bits, LSB) of SFN respectively; $a_{A+4}$ is half frame indication information, and used to indicate that the SSB burst set corresponds to the first half frame or the second half frame. For the licensed spectrum of FR1, $a_{A+5}$ is used to indicate the high order bit (most significant bit, MSB) of $k_{SSB}$, $a_{A+6}$ and $a_{A+7}$ are reserved bits. For FR2, $a_{A+5}$, $a_{A+6}$, and $a_{A+7}$ are respectively used to represent the 6th, 5th, and 4th bits of the SSB index.

2. Information Carried by PBCH in NR-U System

The number of information bits included in the PBCH in the NR-U system is the same as the number of information bits included in the PBCH in the NR system, but the definitions of some of the bits are different, and the specific differences are as follows.

It should be understood that the subcarrier spacing corresponding to SIB1, a message 2 or a message 4 (Msg. 2/4) for initial access, paging and broadcast system messages (SI-messages) are the same. In the NR system, the above subcarrier spacing is indicated by common subcarrier spacing. But in the NR-U system, the subcarrier spacing of SSB is the same as that of SIB1 (and a message 2 or a message 4 for initial access, paging and broadcast system message), and thus the common subcarrier spacing is not used for indicating the subcarrier spacing of SIB1.

(1) When the value indicated by $k_{SSB}$ is less than 24, the common subcarrier spacing in the MIB message and the low order bits in the 4-bit SSB subcarrier offset are used to jointly indicate the QCL hypothesis indication information Q, as shown in Table 5 below.

TABLE 5

QCL hypothesis indication information Q

| common subcarrier spacing | low order bits LSB of $k_{SSB}$ | Q |
|---|---|---|
| scs15or60 | 0 | 1 |
| scs15or60 | 1 | 2 |
| scs30or120 | 0 | 4 |
| scs30or120 | 1 | 8 |

(2) When the subcarrier spacing of SSB is 30 KHz, $a_{A+5}$ is used to indicate the high order bit(s) MSB of $k_{SSB}$; $a_{A+6}$ and $a_{A+7}$ are used to indicate the 5th and 4th bits of the SSB index, respectively.

(3) When the subcarrier spacing of SSB is 15 KHz, $a_{A+5}$ is used to indicate the high order bit(s) MSB of $k_{SSB}$; $a_{A+7}$ is used to indicate the high order bit(s) MSB of the SSB index; $a_{A+6}$ is a reserved bit.

3. $k_{SSB}$

The $k_{SSB}$ is used to indicate an offset between subcarrier 0 in $N_{SSB-CRB}$ and subcarrier 0 of SSB in number of subcarriers. For the licensed spectrum of FR1, $k_{SSB}$ includes 5 bits, the 4 LSBs in $k_{SSB}$ are indicated by the SSB subcarrier offset in MIB, and the MSB in $k_{SSB}$ is indicated by $a_{A+5}$ in the PBCH information. For FR2, $k_{SSB}$ includes 4 bits and is indicated by the SSB subcarrier offset in the MIB. For FR1 unlicensed spectrum, when the value indicated by $k_{SSB}$ is less than 24, the LSB(s) in $k_{SSB}$ is(are) also used to indicate the QCL hypothesis indication information Q.

The $N_{SSB-CRB}$ is obtained according to a higher layer parameter offsetToPointA. For a first SSB (for example, any SSB carrying $k_{SSB}$), the terminal device should assume that the center of subcarrier 0 of $N_{SSB-CRB}$ coincides with the center of subcarrier 0 of a first Common Resource Block (CRB). The subcarrier spacing of the first CRB is the same as that of the SIB1, and the first CRB overlaps with subcarrier 0 of the first Resource Block (RB) of the first SSB.

For a case where the subcarrier spacing of SSB is 15 KHz or 30 KHz, for example, for SSB on FR1, the subcarrier spacing corresponding to $k_{SSB}$ and $N_{SSB-CRB}$ is 15 KHz.

For a case where the subcarrier spacing of SSB is 120 KHz or 240 KHz, for example, for SSB on FR2, the subcarrier spacing corresponding to $k_{SSB}$ is the same as the subcarrier spacing of SIB1, and the subcarrier spacing corresponding to $N_{SSB-CRB}$ is 60 KHz.

Figure 2:
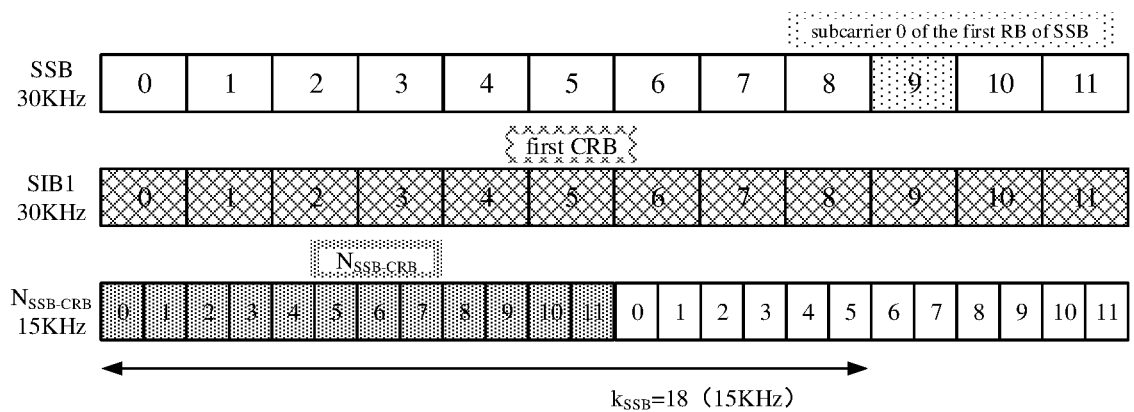
FIG. 2 is a schematic diagram of $k_{SSB}$ indication provided by an embodiment of the present disclosure.

FIG. 2 exemplarily shows a schematic diagram of $k_{SSB}$ indication when the subcarrier spacing of SSB is 30 KHz and the subcarrier spacing of SIB1 is 30 KHz, where the offset subcarrier number indicated by $k_{SSB}$ corresponds to the sub-carrier spacing of 15 KHz (that is, the sub-carrier spacing corresponding to $k_{SSB}$ is 15 KHz). FIG. 3 exemplarily shows a schematic diagram of $k_{SSB}$ indication when the subcarrier spacing of SSB is 120 KHz and the subcarrier spacing of SIB1 is 120 KHz, where the subcarrier spacing corresponding to the offset subcarrier number indicated by $k_{SSB}$ is the subcarrier spacing of SIB1.

4. Common Subcarrier Spacing Indication Information

The common subcarrier spacing indication information is used to indicate the subcarrier spacing corresponding to SIB1, a message 2 or a message 4 (Msg.2/4) for initial access, paging and broadcast system messages (SI-messages). The message 2 is the message 2 in a random access procedure, and the message 4 is message 4 in the random access procedure.

The common subcarrier spacing indication information may indicate scs15or60 or scs30or120.

For FR2, the supported combinations of subcarrier spacing of SSB and subcarrier spacing of SIB1 are as follows:
 SSB 120 KHz+SIB1 60 KHz/120 KHz;
 SSB 240 KHz+SIB1 60 KHz/120 KHz.

If the terminal device obtains MIB on a carrier of FR1, scs15or60 in the MIB corresponds to 15 KHz, and scs30or120 corresponds to 30 KHz; if the terminal device obtains the MIB on a carrier of FR2, scs15or60 in the MIB corresponds to 60 KHz, and scs30or120 corresponds to 120 KHz.

FIG. 4 shows a flowchart of an information determination method provided by an embodiment of the present disclosure, and the method may be applied to the terminal device 10 in the system architecture shown in FIG. 1. The method includes at least some of the following.

In step 410, based on a first frequency range, information used by the terminal device in an initial access procedure is determined.

When a communication system (such as an NR system) is deployed in the first frequency range, a network device and a terminal device in the communication system perform information interaction and data transmission based on the first frequency range. Before information interaction and data transmission, the terminal device needs to access the cell or network where the network device resides. Optionally, the procedure of the terminal device accessing the network where the network device resides may be referred to as an initial access procedure. In an embodiment of the present disclosure, the terminal device needs to determine the information used in the initial access procedure based on the first frequency range. Optionally, the information used by the terminal device in the initial access procedure includes various parameter(s) used in the initial access procedure, such as at least one of subcarrier spacing corresponding to SSB transmission, subcarrier spacing corresponding to SIB1 transmission, QCL hypothesis indication information, subcarrier offset indication information, and the like. For an introduction to the information used by the terminal device during the initial access procedure, please refer to the following embodiments, and details will not be repeated here.

As can be seen from the above descriptions, the relevant technologies mainly study two frequency ranges: FR1 and FR2. Among them, the frequency range of FR1 is 410 MHz to 7.125 GHz, and the frequency range of FR2 is 24.25 GHz to 52.6 GHz. However, the embodiments of the present disclosure mainly study a first frequency range. Optionally, a frequency in the first frequency range is greater than 52.6 GHz and/or equal to 52.6 GHz, that is, the frequency range studied in the embodiments of the present disclosure is a frequency range with a frequency higher than that of FR1 and FR2. Optionally, the first frequency range includes 52.6 GHz to 71 GHz, that is, the first frequency range is "high frequency", "FRX", and the like described in the foregoing embodiments.

In view of the above, in the technical solutions provided by embodiments of the present disclosure, by designing the information transmission in the PBCH on a high frequency band, during the initial access procedure, the network device sends information such as SSB or SIB1 to the terminal device based on the high frequency band, so that the terminal device, based on the high frequency band, the received SSB and PBCH, determines information used in the initial access procedure, such as, determining the subcarrier spacing corresponding to SSB transmission, the subcarrier spacing corresponding to SIB1 transmission, subcarrier offset indication information, QCL hypothesis indication information, etc., and thus the terminal device subsequently uses the information to access a cell where the network device resides to realize information interaction and data transmission with the network device through the high frequency band.

The information transmission in the PBCH designed by the embodiments of the present disclosure for the high frequency band enables the terminal device to perform at least one of determining the meaning of the $k_{SSB}$, determining the subcarrier spacing corresponding to the SIB1 transmission and determining the QCL relationship of the SSB(s) in a case of different combinations of SSB subcarrier spacing and different SIB1 subcarrier spacing, etc. It also ensures the uniform design of SSB transmission on the unlicensed spectrum and the licensed spectrum included in the high frequency band.

In one example, the information transmission in the PBCH designed for the high frequency band in the embodiments of the present disclosure is mainly divided into three parts: subcarrier spacing corresponding to SSB transmission and subcarrier spacing corresponding to SIB1 transmission, subcarrier offset indication information ($k_{SSB}$), and QCL hypothesis indicates information (Q). In the following, these three parts are introduced and explained respectively.

First, the subcarrier spacing corresponding to SSB and the subcarrier spacing corresponding to SIB1 are introduced.

In an example, the information used by the terminal device in the initial access procedure includes first subcarrier spacing. A first SSB is detected by the terminal device on a first frequency band, and the first subcarrier spacing refers to subcarrier spacing corresponding to first SSB transmission. The first frequency band belongs to the first frequency range.

The first frequency range includes at least one frequency band. Assuming that the network device sends the first SSB to the terminal device through the first frequency band in the first frequency range and the terminal device detects the first SSB on the first frequency band, the subcarrier spacing corresponding to the first SSB transmission is the first subcarrier spacing.

Optionally, the first subcarrier spacing is predefined by a communication protocol; and/or, the first subcarrier spacing is determined according to an association relationship. It should be understood that the communication protocol may predefine the specific value of the first subcarrier spacing, such as 120 KHz, and may predefine the association relationship, which is not limited in the embodiments of the present disclosure. The association relationship includes an association relationship between subcarrier spacing corresponding to SSB transmission and a frequency band in the first frequency range.

For example, assuming that the association relationship between the frequency band in the first frequency range and the subcarrier spacing corresponding to SSB transmission includes {Band (bandwidth) M1, A1 KHz} or {Band M2, A2 KHz}, if the terminal device detects the SSB on Band M1, the terminal device may assume that the subcarrier spacing corresponding to the SSB transmission on the Band M1 is A1 KHz, or the terminal device may detect the SSB on the Band M1 according to the subcarrier spacing of A1 KHz. If The terminal device detects SSB on Band M2, the terminal device may assume that the subcarrier spacing corresponding to the SSB transmission on Band M2 is A2 KHz, or the terminal device may detect the SSB on the Band M2 according to the subcarrier spacing of A2 KHz.

For another example, assuming that the association relationship between the frequency band in the first frequency range and the subcarrier spacing corresponding to SSB transmission includes {Band M1, A1/A2 KHz}, if the terminal device detects SSB on Band M1, the terminal device may assume that the subcarrier spacing corresponding to the SSB transmission on the Band M1 is A1 KHz or A2 KHz, or the terminal equipment may detect the SSB on the Band M1 according to the subcarrier spacing of A1 or A2 KHz.

In an example, the information used by the terminal device in the initial access procedure includes second subcarrier spacing. The second subcarrier spacing refers to subcarrier spacing corresponding to first information transmission. The first information is associated with the first SSB. The first SSB is an SSB detected by the terminal device on the first frequency band, and the first frequency band belongs to the first frequency range. The first information includes at least one of the following: SIB1, a message 2 or a message 4 transmitted during the initial access procedure, a paging message, and a system message.

It should be understood that the subcarrier spacing respectively corresponding to SIB1, the message 2 or message 4 transmitted during the initial access procedure, the paging message, and the system message is all the same. In embodiments of the present disclosure, for convenience of description, the "SIB1, message 2 or message 4 transmitted during the initial access procedure, the paging message, and the system message which is associated with the first SSB" are collectively referred to as "first information", and "the subcarrier spacing corresponding to the first information transmission" is referred to as "second subcarrier spacing".

Optionally, the second subcarrier spacing is predefined by a communication protocol; and/or, the second subcarrier spacing is determined based on at least one of the following information: the first subcarrier spacing, the first frequency band, and first indication information. The first subcarrier spacing refers to the subcarrier spacing corresponding to the first SSB transmission. It should be understood that the communication protocol may not only predefine the specific value of the second subcarrier spacing, such as 120 KHz, but may also predefine the determination manner of the second subcarrier spacing, that is, the communication protocol may predefine that the second subcarrier spacing is determined based on at least one piece of the above information, which is not limited in the embodiments of the present disclosure. In a case where the second subcarrier spacing is predefined by the communication protocol, the second subcarrier spacing does not need to be indicated by the network device. Therefore, the common subcarrier spacing indication information in the PBCH in the SSB may be used to indicate other information to achieve indication and carrying of more information.

Taking a case where "the second subcarrier spacing is determined based on at least one of the following information: the first subcarrier spacing, the first frequency band, and the first indication information" as an example, in an embodiment of the present disclosure, the terminal device may determine the second subcarrier spacing based on any one of the above at least one piece of information or a combination of any multiple pieces of information. In the following, several possible determination methods are described.

(1) Optionally, the second subcarrier spacing is determined based on the first subcarrier spacing. In this manner, since the second subcarrier spacing does not need to be indicated by the network device, the common subcarrier spacing indication information may be used to indicate other information.

For example, the second subcarrier spacing is the same as the first subcarrier spacing. As an example, if the subcarrier spacing of the SSB detected by the terminal device is 120 KHz, the subcarrier spacing of the SIB1 corresponding to the SSB is also 120 KHz. As another example, if the subcarrier spacing of the SSB detected by the terminal device is 480 KHz, the subcarrier spacing of the SIB1 corresponding to the SSB is also 480 KHz.

For another example, there is an association relationship between the second subcarrier spacing and the first subcarrier spacing. Assuming that the relationship between the first subcarrier spacing and the second subcarrier spacing includes {A1 KHz, B1 KHz} or {A2 KHz, B2 KHz}, if the subcarrier spacing of the SSB detected by the terminal device is A1 KHz Hz, the subcarrier spacing of the SIB1 corresponding to the SSB is B1 KHz; if the subcarrier spacing of the SSB detected by the terminal device is A2 KHz, the subcarrier spacing of the SIB1 corresponding to the SSB is B2 KHz. As an example, assuming that the relationship between the first subcarrier spacing and the second subcarrier spacing includes {120 KHz, 120 KHz} or {240 KHz, 480 KHz}, if the subcarrier spacing of the SSB detected by the terminal device is 120 KHz, the subcarrier spacing of the SIB1 corresponding to the SSB is 120 KHz; if the subcarrier spacing of the SSB detected by the terminal device is 240 KHz, the subcarrier spacing of the SIB1 corresponding to the SSB is 480 KHz.

(2) Optionally, the second subcarrier spacing is determined based on the first frequency band. In this manner, since the second subcarrier spacing does not need to be indicated by the network device, the common subcarrier spacing indication information may be used to indicate other information.

For example, the association relationship between the first frequency band and the second subcarrier spacing includes {Band M1, B1 KHz} or {Band M2, B2 KHz}. If the SSB is detected by the terminal device on Band M1, the subcarrier spacing of SIB1 corresponding to the SSB is B1 KHz. If the SSB is detected by the terminal device on Band M2, the subcarrier spacing of SIB1 corresponding to the SSB is B2 KHz.

(3) Optionally, the second subcarrier spacing is determined based on the first subcarrier spacing and the first frequency band. In this manner, since the second subcarrier spacing does not need to be indicated by the network device, the common subcarrier spacing indication information may be used to indicate other information.

For example, the association relationship between the first frequency band and the first subcarrier spacing and the second subcarrier spacing includes {Band M1, A1 KHz, B1 KHz} or {Band M2, A2 KHz, B2 KHz}. If the SSB is detected by the terminal device on Band M1 and the subcarrier spacing of the SSB is A1 KHz, the subcarrier spacing of the SIB1 corresponding to the SSB is B1 KHz. If the SSB is detected by the terminal device on Band M2 and the subcarrier spacing of the SSB is A2 KHz, the subcarrier spacing of the SIB1 corresponding to the SSB is B2 KHz.

As an example, it is assumed that the association relationship between the first frequency band and the first subcarrier spacing and the second subcarrier spacing includes {Band M1, 120 KHz, 120 KHz} or {Band M1, 240 KHz, 960 KHz}. When the SSB is detected by the terminal device on Band M1, if the subcarrier spacing of the SSB is 120 KHz, the subcarrier spacing of SIB1 corresponding to the SSB is 120 KHz. If the subcarrier spacing of the SSB is 240 KHz, the subcarrier spacing of the SIB1 corresponding to the SSB is 960 KHz.

As another example, it is assumed that the association relationship between the first frequency band and the first subcarrier spacing and the second subcarrier spacing includes {Band M1, 120 KHz, 120 KHz} or {Band M2, 480 KHz, 480 KHz}. If the terminal device detects the SSB on Band M1, the terminal device may determine that the subcarrier spacing of the SSB on Band M1 is 120 KHz, and the subcarrier spacing of SIB1 corresponding to the SSB on Band M1 is 120 KHz. If the terminal device detects the SSB on Band M2, the terminal device may determine that the subcarrier spacing of the SSB on Band M2 is 480 KHz, and the subcarrier spacing of SIB1 corresponding to the SSB on Band M2 is 480 KHz.

(4) Optionally, the second subcarrier spacing is determined based on the first indication information. Optionally, the first indication information includes at least one of the following: common subcarrier spacing indication information, and other information carried in the PBCH in the first SSB. In this manner, the network device indicates the second subcarrier spacing, which can more flexibly support multiple combinations of the subcarrier spacing corresponding to the SSB transmission and the subcarrier spacing corresponding to the SIB1 transmission during the initial access procedure.

For example, the first indication information includes 1-bit common subcarrier spacing indication information. As an example, the 1-bit common subcarrier spacing indication information is used to indicate that the subcarrier spacing of SIB1 is B1 KHz or B2 KHz. As another example, the 1-bit common subcarrier spacing indication information may indicate scs15or60 or B1 or scs30or120 or B2. If the terminal device acquires the MIB on a carrier of FR1, scs15or60orB1 in the MIB corresponds to 15 KHz, scs30or120orB2 corresponds to 30 KHz; if the terminal device obtains the MIB on a carrier of FR2, scs15or60orB1 in the MIB corresponds to 60 KHz, and scs30or120orB2 corresponds to 120 KHz; if the terminal device obtains the MIB on a carrier of FRX, scs15or60orB1 in the MIB corresponds to B1 KHz, and scs30or120orB2 corresponds to B2 KHz.

For another example, the first indication information includes 2 bits, wherein 1 bit is common subcarrier spacing indication information, and the other 1 bit is other information carried in the PBCH in the first SSB. Optionally, the other information includes at least one of the following: TypeA DMRS position indication information, SIB1 PDCCH configuration information, subcarrier offset indication information, a spare bit, MIB message type indication information, and half frame indication information. As an example, the first indication information is used to indicate that the subcarrier spacing of SIB1 is B1 KHz, B2 KHz or B3 KHz.

(5) Optionally, the second subcarrier spacing is determined based on the first frequency band and the first indication information. In this manner, by indicating the second subcarrier spacing through the network device, it is possible to more flexibly support multiple combinations of the subcarrier spacing corresponding to SSB transmission and the subcarrier spacing corresponding to SIB1 transmission during the initial access procedure.

For example, the association relationship between the first frequency band and the second subcarrier spacing includes {Band M1, B1/B2 KHz}. If the SSB is detected by the terminal device on Band M1, the first indication information (such as common subcarrier spacing indication information)

is used to indicate that the subcarrier spacing of the SIB1 corresponding to the SSB is B1 or B2 KHz.

As an example, the association relationship between the first frequency band and the second subcarrier spacing includes {Band M1, 120 or 480 KHz} and {Band M2, 120 or 960 KHz}. If the SSB is detected by the terminal device on Band M1, the first indication information (such as common subcarrier spacing indication information) is used to indicate that the subcarrier spacing of SIB1 corresponding to the SSB is 120 or 480 KHz. If the SSB is detected by the terminal device on Band M2, the first indication information (such as common subcarrier spacing indication information) is used to indicate that the subcarrier spacing of the SIB1 corresponding to the SSB is 120 or 960 KHz.

(6) Optionally, the second subcarrier spacing is determined based on the first subcarrier spacing and the first indication information. In this manner, by indicating the second subcarrier spacing through the network device, it is possible to more flexibly support multiple combinations of the subcarrier spacing corresponding to SSB transmission and the subcarrier spacing corresponding to SIB1 transmission during the initial access procedure.

For example, the association relationship between the first subcarrier spacing and the second subcarrier spacing includes {A1 KHz, B1/B2 KHz}. If the subcarrier spacing of the SSB detected by the terminal device is A1 KHz, the first indication information (such as common subcarrier spacing indication information) is used to indicate that the subcarrier spacing of the SIB1 corresponding to the SSB is B1 or B2 KHz.

As an example, the association relationship between the first subcarrier spacing and the second subcarrier spacing includes {120 KHz, 120 or 480 KHz} and {480 KHz, 480 or 960 KHz}. If the subcarrier spacing of the SSB detected by the terminal device is 120 KHz, the first indication information (such as common subcarrier spacing indication information) is used to indicate that the subcarrier spacing of SIB1 corresponding to the SSB is 120 or 480 KHz. If the subcarrier spacing of the SSB detected by the terminal device is 480 KHz, the first indication information (for example, common subcarrier spacing indication information) is used to indicate that the subcarrier spacing of the SIB1 corresponding to the SSB is 480 or 960 KHz.

(7) Optionally, the second subcarrier spacing is determined based on the first indication information, the first subcarrier spacing, and the first frequency band. In this manner, by indicating the second subcarrier spacing through the network device, it is possible to more flexibly support multiple combinations of the subcarrier spacing corresponding to SSB transmission and the subcarrier spacing corresponding to SIB1 transmission during the initial access procedure.

For example, the association relationship between the first frequency band and the first subcarrier spacing and the second subcarrier spacing includes {Band M1, A1 KHz, B1/B2 KHz}. If the SSB is detected by the terminal device on Band M1 and the subcarrier spacing of the SSB is A1 KHz, the first indication information (for example, common subcarrier spacing indication information) is used to indicate that the subcarrier spacing of the SIB1 corresponding to the SSB is B1 or B2 KHz.

As an example, it is assumed that the relationship between the first frequency band and the first subcarrier spacing and the second subcarrier spacing includes {Band M1, 120 KHz, 120/480 KHz} or {Band M1, 240 KHz, 480/960 KHz}. When the SSB is detected by the terminal device on Band M1, if the subcarrier spacing of the SSB is 120 KHz, the first indication information (such as common subcarrier spacing indication information) is used to indicate that the subcarrier spacing of the SIB1 corresponding to the SSB is 120 or 480 KHz. If the subcarrier spacing of the SSB is 240 KHz, the first indication information (such as the common subcarrier spacing indication information) is used to indicate that the subcarrier spacing of the SIB1 corresponding to the SSB 480 or 960 KHz.

It should be noted that, the manner of determining the second subcarrier spacing may also be a combination of the above various manners if such combination will not cause any conflict. Taking a case where {120/480, 120/480} KHz includes SSB 120 KHz+SIB1 120 KHz, SSB 480 KHz+SIB1 480 KHz, and SSB 120 KHz+SIB1 480 KHz as an example, when the subcarrier spacing of the SSB detected by the terminal device is 480 KHz, the terminal device assumes that the subcarrier spacing of SIB1 is the same as that of the SSB, which is also 480 KHz. When the subcarrier spacing of the SSB detected by the terminal device is 120 KHz, the terminal device determines that the subcarrier spacing of the SIB1 corresponding to the SSB is 120 or 480 KHz according to the first indication information (such as common subcarrier spacing indication information).

In an example, the above-mentioned first subcarrier spacing includes at least one of the following: 120 KHz, 240 KHz, 480 KHz, and 960 KHz. In another example, the foregoing second subcarrier spacing includes at least one of the following: 120 KHz, 240 KHz, 480 KHz, and 960 KHz. Based on this, the possibly supported combination of the first subcarrier spacing and the second subcarrier spacing {the first subcarrier spacing, the second subcarrier spacing} include one of the following situations:

(1) Case 1: {A1, B1} KHz; for example, {120, 120} KHz.
(2) Case 2: {A1/A2, B1} KHz; for example, {120/240, 120} KHz; as another example, {120/480, 120} KHz; as another example, {120/960, 120} KHz.
(3) Case 3: {A1, B1/B2} KHz; for example, {120, 120/480} KHz; as another example, {120, 120/960} KHz; as another example, {120, 120/240} KHz.
(4) Case 4: {A1/A2, B1/B2} KHz; for example, {120/480, 120/480} KHz; as another example, {120/480, 120/960} KHz; as another example, {120/960, 120/480} KHz; as another example, {120/960, 120/960} KHz; as another example, {120/240, 120/480} KHz; as another example, {120/240, 120/960} KHz; as another example, {120/240, 120/240} KHz.
(5) Case 5: {A1, B1/B2/B3} KHz; for example, {120, 120/480/960} KHz.
(6) Case 6: {A1/A2, B1/B2/B3} KHz; for example, {120/480, 120/480/960} KHz; as another example, {120/960, 120/480/960} KHz; as another example, {120/240, 120/480/960} KHz.
(7) Case 7: {A1/A2/A3, B1/B2/B3} KHz; for example, {120/480/960, 120/480/960} KHz.

It should be understood that taking the case of {A1/A2, B1/B2} KHz as an example, the combination of {A1/A2, B1/B2} KHz includes at least one of the following:

the first subcarrier spacing is A1 KHz and the second subcarrier spacing is B1 KHz;
the first subcarrier spacing is A1 KHz and the second subcarrier spacing is B2 KHz;
the first subcarrier spacing is A2 KHz and the second subcarrier spacing is B1 KHz;
the first subcarrier spacing is A2 KHz and the second subcarrier spacing is B2 KHz.

For example, {120/480, 120/480} KHz includes: SSB 120 KHz+SIB1 120 KHz, SSB 480 KHz+SIB1 480 KHz, SSB 120 KHz+SIB1 480 KHz, and SSB 480 kHz+SIB1 120 KHz. For another example, {120/480, 120/480} KHz includes SSB 120 KHz+SIB1 120 KHz and SSB 480 KHz+SIB1 480 KHz.

Optionally, the network device transmits the SSB according to the discovery signal transmission opportunity window, and the terminal device detects the SSB according to the discovery signal transmission opportunity window. Optionally, the length of the discovery signal transmission opportunity window may be preset or configured by the network device. Optionally, the length of the discovery signal transmission opportunity window is associated with the first subcarrier spacing.

Secondly, the subcarrier offset indication information ($k_{SSB}$) is introduced.

In an example, the information used by the terminal device in the initial access procedure includes subcarrier offset indication information. The subcarrier offset indication information is carried in the PBCH in the first SSB, and the first SSB is an SSB detected by the terminal device on the first frequency band. The first frequency band belongs to the first frequency range. The subcarrier offset indication information is used to indicate the offset between subcarrier 0 of a second CRB and subcarrier 0 of the first RB of the first SSB in number of subcarriers. The center of subcarrier 0 of the second CRB coincides with the center of subcarrier 0 of the first CRB, and the first CRB overlaps with subcarrier 0 of the first RB of the first SSB.

In the embodiments of the present disclosure, optionally, the second CRB may also be called "$N_{SSB\text{-}CRB}$". For the convenience of description, the technical solutions in the embodiments of the present disclosure are described using the name of "second CRB". Optionally, the subcarrier spacing corresponding to the second CRB is equal to the subcarrier spacing corresponding to the first CRB, and the second CRB and the first CRB are the same CRB. Based on this, the above subcarrier offset indication information is used to indicate the offset between subcarrier 0 in the first CRB and subcarrier 0 of the first RB of the first SSB in number of subcarriers, and the first CRB overlaps with subcarrier 0 of the first RB of the first SSB.

Before further introducing and explaining the technical solutions provided by the embodiments of the present disclosure, the following assumptions are made: the first subcarrier spacing refers to the subcarrier spacing corresponding to the first SSB transmission; the second subcarrier spacing refers to the subcarrier spacing corresponding to the first information transmission, the first information is associated with the first SSB, and the first information includes at least one of the following: SIB1, a message 2 or message 4 transmitted during the initial access procedure, a paging message, and a system message. It should be understood that the following embodiments are based on the above assumptions.

Optionally, a ratio of the second subcarrier spacing to the first subcarrier spacing is N2, and the valid indication values of $k_{SSB}$ are 0, 1, . . . , 12*ceil(N2)−1, where ceil represents rounding up. Optionally, the number of bits included in the $k_{SSB}$ is ceil(log 2(12*ceil(N2))), where log 2 represents a logarithm with base 2.

For example, assuming that the ratio of the second subcarrier spacing to the first subcarrier spacing is 2, the valid indication values of $k_{SSB}$ are 0, 1, . . . , 23, and the number of bits included in $k_{SSB}$ is ceil(log 2(24))=5 bits.

For another example, assuming that the ratio of the second subcarrier spacing to the first subcarrier spacing is 1, the valid indication values of $k_{SSB}$ are 0, 1, . . . , 11, and the number of bits included in $k_{SSB}$ is ceil(log 2(12))=4 bits.

For another example, assuming that the ratio of the second subcarrier spacing to the first subcarrier spacing is 0.5, the valid indication values of $k_{SSB}$ are 0, 1, . . . , 11, and the number of bits included in $k_{SSB}$ is ceil(log 2(12))=4 bits.

Optionally, when $k_{SSB}$ includes 4 bits, $k_{SSB}$ is indicated by the SSB subcarrier offset in MIB; when the number of bits included in $k_{SSB}$ is greater than 4 bits, the extra 1 bit included in $k_{SSB}$ is indicated by information bit(s) carried by the PBCH, wherein the information bit(s) carried by the PBCH includes(include) information in the MIB, MIB message type indication and a PBCH information bit.

In embodiments of the present disclosure, for the size relationship between the first subcarrier spacing and the second subcarrier spacing, different limitations may be selectively imposed on the valid indication values of $k_{SSB}$. Based on this, the number of subcarriers of the offset indicated by the subcarrier offset indication information includes one of the following situations.

(1) Optionally, in a case where the first subcarrier spacing is the same as the second subcarrier spacing, the range corresponding to the number of subcarriers of the offset indicated by the subcarrier offset indication information includes one of the following situations: {0, 1, 2, 3, 4, 5, 6, 7, 8, 9, 10, 11}; {0, 2, 4, 6, 8, 10}; {0, 4, 8}; {1, 3, 5, 7, 9, 11}; {3, 7, 11}.

(2) Optionally, when the first subcarrier spacing is greater than the second subcarrier spacing and the ratio of the first subcarrier spacing to the second subcarrier spacing is N1, the range corresponding to the number of subcarriers of the offset indicated by the subcarrier offset indication information includes one of the following situations: {0, N1, 2*N1, . . . , (M1−1)*N1}, where M1*N1=m*12, m is the smallest positive integer satisfying M1*N1=m*12; {0, 2, 4, 6, 8, 10}; {0, 4, 8}; {1, 3, 5, 7, 9, 11}; {3, 7, 11}.

For example, the number of subcarriers of the offset indicated by $k_{SSB}$ is m1*N1, the first subcarrier spacing is 480 KHz and the second subcarrier spacing is 120 KHz, then N1=480/120=4, M1*4=1*12, M1=3, then m1=0, 1, 2, and the number of subcarriers of the offset indicated by $k_{SSB}$ is 0, 4, or 8.

For another example, the number of subcarriers of the offset indicated by $k_{SSB}$ is m1*N1, the first subcarrier spacing is 960 KHz and the second subcarrier spacing is 120 KHz, then N1=960/120=8, M1*8=2*12, M1=3, then m1=0, 1, 2, and the number of subcarriers of the offset indicated by the $k_{SSB}$ is 0, 4, or 8.

For another example, the number of subcarriers of the offset indicated by $k_{SSB}$ is m1*N1, the first subcarrier spacing is 240 KHz and the second subcarrier spacing is 120 KHz, then N1=240/120=2, M1*2=1*12, M1=6, then m1=0, 1, 2, 3, 4, 5, and the number of subcarriers of the offset indicated by $k_{SSB}$ is 0, 2, 4, 6, 8, or 10.

(3) Optionally, in a case where the first subcarrier spacing is smaller than the second subcarrier spacing and the ratio of the second subcarrier spacing to the first subcarrier spacing is N 2, the range corresponding to the number of subcarriers of the offset indicated by the subcarrier offset indication information includes one of the following situations: {0, 1, 2, . . . , 12*N2−1}; {0, 1, 2, 3, 4, 5, 6, 7, 8, 9, 10, 11}; {0, 2, 4, 6, 8, 10}; {0, 4, 8}; {1, 3, 5, 7, 9, 11}; {3, 7, 11}.

(4) Optionally, in a case where the first subcarrier spacing is smaller than the second subcarrier spacing and the ratio of the second subcarrier spacing to the first subcarrier spacing is N 2, the subcarrier index range in one RB corresponding to subcarrier 0 of the first RB of the first SSB includes one of the following situations: {0, 1, 2, 3, 4, 5, 6, 7, 8, 9, 10, 11}; {0, N2, 2*N2, ..., (M2−1)*N2}, wherein M2*N2=n*12, n is the smallest positive integer satisfying M2*N 2=n*12; {0, 2, 4, 6, 8, 10}; {0, 4, 8}.

For example, the position of subcarrier 0 of the first RB of the first SSB may be m2*N2, the first subcarrier spacing is 120 KHz and the second subcarrier spacing is 480 KHz, then N2=480/120=4, M2*4=1*12, M2=3, then m2=0, 1, 2, and the position of subcarrier 0 of the first RB of the first SSB may be 0, 4, or 8.

For another example, the position of subcarrier 0 of the first RB of the first SSB may be m2*N2, the first subcarrier spacing is 120 KHz and the second subcarrier spacing is 960 KHz, then N2=960/120=8, M2*8=2*12, M2=3, then m2=0, 1, 2, and the position of subcarrier 0 of the first RB of the first SSB may be 0, 4, or 8.

For another example, the position of subcarrier 0 of the first RB of the first SSB may be m2*N2, the first subcarrier spacing is 120 KHz and the second subcarrier spacing is 240 KHz, then N2=240/120=2, M2*2=1*12, M2=6, then m2=0, 1, 2, 3, 4, 5, and the position of subcarrier 0 of the first RB of the first SSB may be 0, 2, 4, 6, 8, or 10.

The embodiments of the present disclosure do not limit the determination manner of the subcarrier spacing corresponding to the subcarrier offset indication information, the subcarrier spacing corresponding to the first CRB, and the subcarrier spacing corresponding to the second CRB.

Optionally, the subcarrier spacing corresponding to the subcarrier offset indication information is predefined by a communication protocol; or, the subcarrier spacing corresponding to the subcarrier offset indication information is equal to the first subcarrier spacing; or, the subcarrier spacing corresponding to the subcarrier offset indication information is equal to the second subcarrier spacing; or the subcarrier spacing corresponding to the subcarrier offset indication information is equal to the subcarrier spacing corresponding to the first CRB; or the subcarrier spacing corresponding to the subcarrier offset indication information is equal to the subcarrier spacing corresponding to the second CRB.

Optionally, the subcarrier spacing corresponding to the first CRB is predefined by a communication protocol; or, the subcarrier spacing corresponding to the first CRB is equal to the subcarrier spacing corresponding to the subcarrier offset indication information; or, the subcarrier spacing corresponding to the first CRB is equal to the first subcarrier spacing; or, the subcarrier spacing corresponding to the first CRB is equal to the second subcarrier spacing; or, the subcarrier spacing corresponding to the first CRB is equal to the subcarrier spacing corresponding to the second CRB.

Optionally, the subcarrier spacing corresponding to the second CRB is predefined by a communication protocol; or, the subcarrier spacing corresponding to the second CRB is equal to the subcarrier spacing corresponding to the first CRB; or, the subcarrier spacing corresponding to the second CRB is equal to the subcarrier spacing corresponding to the subcarrier offset indication information; or, the subcarrier spacing corresponding to the second CRB is equal to the first subcarrier spacing; or, the subcarrier spacing corresponding to the second CRB is equal to the second subcarrier spacing.

In the embodiments of the present disclosure, the specific determination manner of the subcarrier spacing corresponding to the subcarrier offset indication information, and/or the specific determination manner of the subcarrier spacing corresponding to the first CRB, may be the same as the specific determination manner of the subcarrier spacing corresponding to the second CRB. In the following embodiments, only the specific determination manner of the subcarrier spacing corresponding to the second CRB is used as an example for introduction and description. It should be understood that after those skilled in the art understand the specific determination manner of the subcarrier spacing corresponding to the second CRB, it will be easy to derive the specific determination manner of the subcarrier spacing corresponding to the subcarrier offset indication information, and/or the specific determination manner of the subcarrier spacing corresponding to the first CRB.

For the case where the subcarrier spacing corresponding to the second CRB is predefined by the communication protocol, optionally, the subcarrier spacing corresponding to the second CRB may be predefined as a specific value, such as 120 KHz, or its determination manner may be predefined. Optionally, the predefined determination manner for the second CRB includes one of the following situations.

(1) Optionally, the subcarrier spacing corresponding to the second CRB is predefined as subcarrier spacing less than or equal to the first subcarrier spacing; or, the subcarrier spacing corresponding to the second CRB is predefined as the smallest first subcarrier spacing among all supported first subcarrier spacing.

(2) Optionally, the subcarrier spacing corresponding to the second CRB is predefined as subcarrier spacing less than or equal to the second subcarrier spacing; or, the subcarrier spacing corresponding to the second CRB is predefined as the smallest second subcarrier spacing among all supported second subcarrier spacing.

(3) Optionally, the subcarrier spacing corresponding to the second CRB is predefined as subcarrier spacing greater than or equal to the first subcarrier spacing; or, the subcarrier spacing corresponding to the second CRB is predefined the largest first subcarrier spacing among all supported first subcarrier spacing.

(4) Optionally, the subcarrier spacing corresponding to the second CRB is predefined as subcarrier spacing greater than or equal to the second subcarrier spacing; or, the subcarrier spacing corresponding to the second CRB is predefined as the largest second subcarrier spacing among all supported second subcarrier spacing.

(5) Optionally, the subcarrier spacing corresponding to the second CRB is predefined as the smallest subcarrier spacing among all supported first subcarrier spacing and second subcarrier spacing; or, the subcarrier spacing corresponding to the second CRB is predefined as the largest subcarrier spacing among all supported first subcarrier spacing and second subcarrier spacing.

In embodiments of the present disclosure, different determination manners of the subcarrier spacing corresponding to the second CRB may be predefined for the size relationship between the first subcarrier spacing and the second subcarrier spacing. Based on this, optionally, the manner of determining the subcarrier spacing corresponding to the second CRB includes one of the following situations.

(1) Optionally, for a case where the first subcarrier spacing is equal to the second subcarrier spacing, the subcarrier spacing corresponding to the second CRB is predefined to be subcarrier spacing less than or equal to the subcarrier spacing; or, the subcarrier spacing corresponding to the second CRB is predefined as the smallest first subcarrier spacing among all supported first subcarrier spacing; or, the subcarrier spacing corresponding to the second CRB is predefined to be subcarrier spacing less than or equal to the second subcarrier spacing; or, the subcarrier spacing corresponding to the second CRB is predefined as the smallest second subcarrier spacing among all supported second subcarrier spacing. For example, the subcarrier spacing corresponding to the second CRB is predefined as 120 KHz.

(2) Optionally, for a case where the first subcarrier spacing is greater than the second subcarrier spacing, the subcarrier spacing corresponding to the second CRB is predefined to be subcarrier spacing less than or equal to the second subcarrier spacing; or, the subcarrier spacing corresponding to the second CRB is predefined as the smallest second subcarrier spacing among all supported second subcarrier spacing. For example, the subcarrier spacing corresponding to the second CRB is predefined as 120 KHz.

(3) Optionally, for a case where the first subcarrier spacing is smaller than the second subcarrier spacing, the subcarrier spacing corresponding to the second CRB is predefined to be subcarrier spacing greater than or equal to the second subcarrier spacing; or, the subcarrier spacing corresponding to the second CRB is predefined as the largest second subcarrier spacing among all supported second subcarrier spacing. For example, the subcarrier spacing corresponding to the second CRB is predefined as 480 KHz.

Based on the foregoing embodiments, some embodiments of the present disclosure exemplarily provide schematic diagrams of several $k_{SSB}$ indication values.

(1) for a Case where the First Subcarrier Spacing is Equal to the Second Subcarrier Spacing As an example but not a limitation, in the case of SSB 480 KHz+SIB1 480 KHz, please refer to FIG. 5, the subcarrier spacing corresponding to the second CRB is predefined as 120 KHz. The subcarrier spacing corresponding to the $k_{SSB}$ is the same as the second subcarrier spacing. The $k_{SSB}$ indication value is 8, indicating that the number of subcarriers of the offset between subcarrier 0 in the second CRB and subcarrier 0 of the first RB of the SSB is 8.

Figure 6:
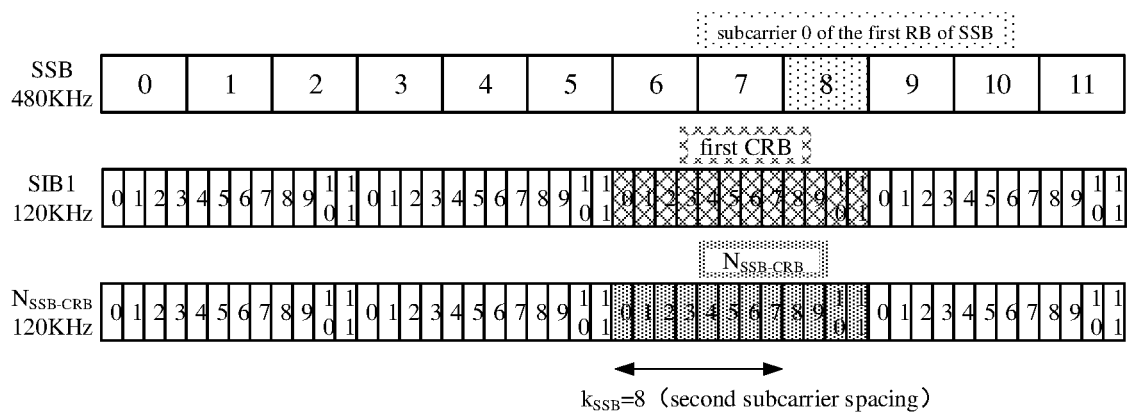
FIG. 6 is a schematic diagram of $k_{SSB}$ indication provided by another embodiment of the present disclosure.

(2) for a Case where the First Subcarrier Spacing is Greater than the Second Subcarrier Spacing As an example but not a limitation, in the case of SSB 480 KHz+SIB1 120 KHz, please refer to FIG. 6, the subcarrier spacing corresponding to the second CRB is predefined as 120 KHz. The subcarrier spacing corresponding to the $k_{SSB}$ is the same as the second subcarrier spacing. The $k_{SSB}$ indication value is 8, indicating that the number of subcarriers of the offset between subcarrier 0 in the second CRB and subcarrier 0 of the first RB of the SSB is 8.

Figure 7:
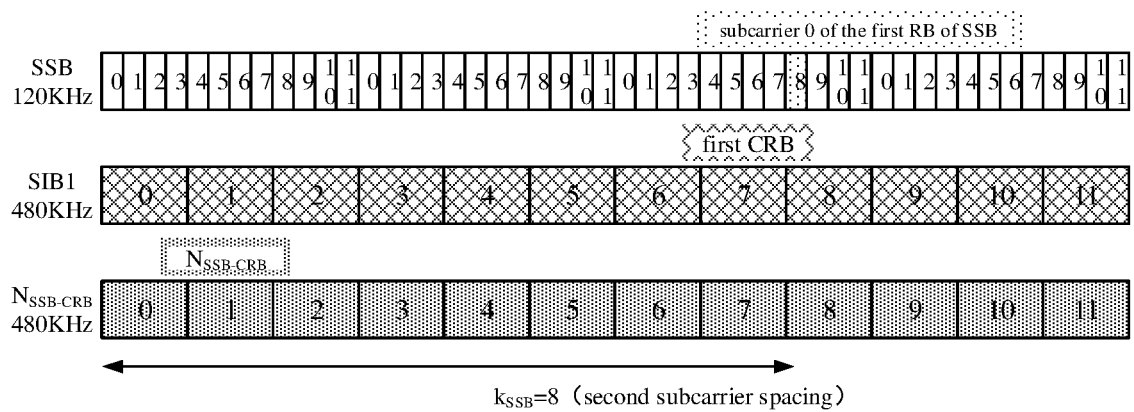
FIG. 7 is a schematic diagram of $k_{SSB}$ indication provided by another embodiment of the present disclosure.

(3) for a Case where the First Subcarrier Spacing is Smaller than the Second Subcarrier Spacing As an example but not a limitation, in the case of SSB 120 KHz+SIB1 480 KHz, please refer to FIG. 7, $k_{SSB}$ indicates a value of 8, indicating that the number of subcarriers of the offset between subcarrier 0 in the second CRB and subcarrier 0 of the first RB of the SSB is 8. The subcarrier spacing corresponding to the second CRB is the same as the second subcarrier spacing, and the subcarrier spacing corresponding to the $k_{SSB}$ is the same as the second subcarrier spacing. Also, in this example, the position where the SSB may be placed is limited. For example, subcarrier 0 of the first RB of an SSB can only be located on subcarrier 0, 4 or 8 in one RB.

Figure 8:
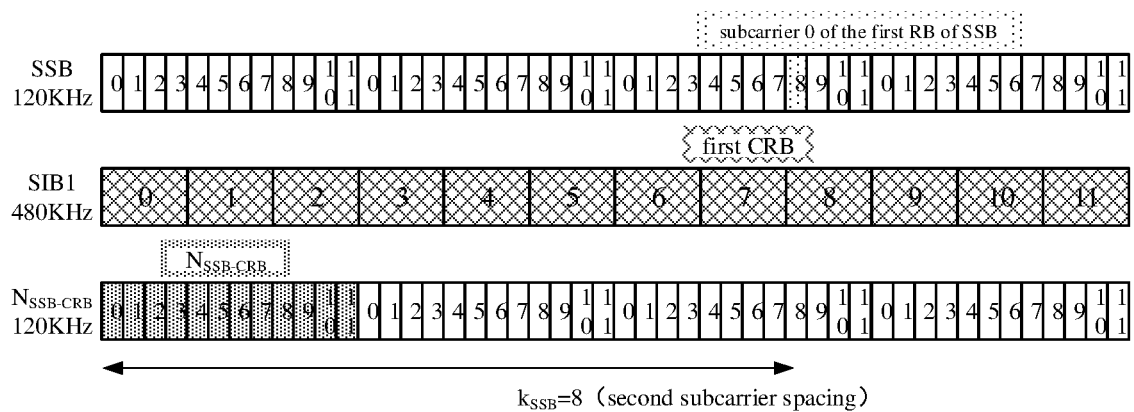
FIG. 8 is a schematic diagram of $k_{SSB}$ indication provided by another embodiment of the present disclosure.

(4) for a Case where the First Subcarrier Spacing is Smaller than the Second Subcarrier Spacing As an example but not a limitation, in the case of SSB 120 KHz+SIB1 480 KHz, please refer to FIG. 8, the subcarrier spacing corresponding to the second CRB is predefined as 120 KHz. The subcarrier spacing corresponding to the $k_{SSB}$ is the same as the second subcarrier spacing. The $k_{SSB}$ indication value is 8, indicating that the number of subcarriers of the offset between subcarrier 0 in the second CRB and subcarrier 0 of the first RB of the SSB is 8. Also, in this example, the position where the SSB can be placed is limited. For example, subcarrier 0 of the first RB of an SSB can only be located on subcarrier 0, 4 or 8 in one RB.

Regarding the size relationship between the first subcarrier spacing and the second subcarrier spacing involved in the above embodiments, somes embodiments of the present disclosure show the following combinations of {first subcarrier spacing, second subcarrier spacing}.

(1) Case 1: the first subcarrier spacing is equal to the second subcarrier spacing. As an example, the combination of the first subcarrier spacing being equal to the second subcarrier spacing includes at least one of the following: {120, 120} KHz; {480, 480}KHz; {960, 960} KHz; {240, 240} KHz.

(2) Case 2: the first subcarrier spacing is greater than the second subcarrier spacing. As an example, the case where the first subcarrier spacing is greater than the second subcarrier spacing includes at least one of the following: {240, 120} KHz; {480, 120} KHz; {960, 120} KHz; {480, 240} KHz; {960, 240} KHz; {960, 480} KHz.

(3) Case 3: the first subcarrier spacing is smaller than the second subcarrier spacing. As an example, the case where the first subcarrier spacing is smaller than the second subcarrier spacing includes at least one of the following: {120, 480} KHz; {120, 960} KHz; {120, 240} KHz; {240, 480} KHz; {240, 960} KHz; {480, 960} KHz.

In the following, the QCL hypothesis indication information (Q) will be introduced.

In an example, the information used by the terminal device in the initial access procedure includes QCL hypothesis indication information. The QCL hypothesis indication information is used to indicate a QCL relationship between SSB candidate positions.

The embodiments of the present disclosure do not limit the number of bits occupied by the QCL hypothesis indication information. Optionally, the QCL hypothesis indication information occupies 1 bit, or the QCL hypothesis indication information occupies 2 bits.

For a case where the QCL hypothesis indication information (Q) occupies 2 bits, the value indicated by the QCL hypothesis indication information may include the following situations.

Optionally, the value indicated by Q is 8, 16, 32, or 64, SSB index=(candidate SSB index mod Q). It should be understood that when the maximum number of candidate positions for SSB transmission in one SSB burst set or one discovery signal transmission opportunity window is 64, if the value indicated by Q is 64, it means that one SSB index corresponds only to one SSB candidate position in one SSB burst set or one discovery signal transmission opportunity window, that is to say, no additional SSB transmission opportunity is added for one SSB index. Optionally, when the SSB is transmitted on the licensed frequency band included in the first frequency range or the SSB does not correspond to the LBT procedure during transmission, the value indicated by Q is 64, or the UE does not expect that the value indicated by Q is not 64.

Optionally, the value indicated by Q is 1, 2, 4, or 8. The Q value represents the number of candidate positions included in one SSB burst set or one discovery signal transmission opportunity window by one SSB index. For example, Q indicates 2, meaning that one SSB index includes two candidate positions in one SSB burst set or one discovery signal transmission opportunity window. Optionally, when the SSB is transmitted on the licensed frequency band included in the first frequency range or the SSB does not correspond to the LBT procedure during transmission, the value indicated by Q is 1, or the UE does not expect that the value indicated by Q is not 1.

Since frequency bands in the first frequency range include relatively high frequencies and channel fading is relatively large, the coverage of a cell deployed in the first frequency range is usually small. In this case, the interference between neighboring cells is usually small. Correspondingly, on the unlicensed spectrum included in the first frequency range, a communication device has a higher probability of LBT success, and thus obtains more transmission opportunities. Therefore, there may be no need to introduce too many SSB candidate positions to increase the transmission opportunity of the SSB. Correspondingly, the number of bits included in the QCL hypothesis indication information may also be reduced. Based on this, in an example, the QCL hypothesis indication information occupies 1 bit.

For a case where the QCL hypothesis indication information (Q) occupies 1 bit, the value indicated by the QCL hypothesis indication information may include the following situations.

Optionally, the value indicated by Q is 32 or 64; or, the value indicated by Q is 16 or 64, SSB index=(candidate SSB index mod Q). Optionally, when the SSB is transmitted on the licensed frequency band included in the first frequency range or the SSB does not correspond to the LBT procedure during transmission, the value indicated by Q is 64, or the UE does not expect that the value indicated by Q is not 64.

Optionally, the value indicated by Q is 1 or 2; or, the value indicated by Q is 1 or 4. The Q value represents the number of candidate positions included in one SSB burst set or one discovery signal transmission opportunity window by one SSB index. For example, Q indicates 2, meaning that one SSB index includes two candidate positions in one SSB burst set or one discovery signal transmission opportunity window. Optionally, when the SSB is transmitted on the licensed frequency band included in the first frequency range or the SSB does not correspond to the LBT procedure during transmission, the value indicated by Q is 1, or the UE does not expect that the value indicated by Q is not 1.

The embodiments of the present disclosure do not limit the method of determining the QCL hypothesis indication information. Optionally, the QCL hypothesis indication information is predefined by a communication protocol; or, the QCL hypothesis indication information is indicated by second information carried in the PBCH in the first SSB. Optionally, the second information includes at least one of the following: third information in the MIB, MIB message type indication information, and half-frame indication information. The third information includes at least one of the following information: common subcarrier spacing indication information, subcarrier offset indication information, TypeA DMRS position indication information, SIB1 PDCCH configuration information, and a spare bit. The following describes the situation that the QCL hypothesis indication information is indicated by the second information carried in the PBCH.

Optionally, the QCL hypothesis indication information is indicated by 1-bit common subcarrier spacing indication information in the MIB, for example, indicated by subCarrierSpacingCommon.

Optionally, the QCL hypothesis indication information is indicated by 4-bit subcarrier offset indication information in the MIB, for example, indicated by a low order bit (i.e., the fourth bit) in the $k_{SSB}$. Optionally, when the value indicated by $k_{SSB}$ is less than a first preset value, the QCL hypothesis indication information is indicated by 4-bit subcarrier offset indication information in the MIB, for example, indicated by the low order bit in $k_{SSB}$. Optionally, the first preset value is 12.

Optionally, the QCL hypothesis indication information is indicated by 4-bit subcarrier offset indication information in the MIB, for example, indicated by a high order bit (i.e., the first bit) in $k_{SSB}$. Optionally, when the value indicated by $k_{SSB}$ is less than the first preset value, the QCL hypothesis indication information is indicated by 4-bit subcarrier offset indication information in the MIB, for example, indicated by the high order bit in $k_{SSB}$. Optionally, the first preset value is 12.

Optionally, the QCL hypothesis indication information is indicated by 4-bit subcarrier offset indication information in the MIB, for example, indicated by the second bit in the $k_{SSB}$. Optionally, when the value indicated by $k_{SSB}$ is less than the first preset value, the QCL hypothesis indication information is indicated by 4-bit subcarrier offset indication information in the MIB, for example, indicated by the second bit in $k_{SSB}$.

Optionally, the QCL hypothesis indication information is indicated by 4-bit subcarrier offset indication information in the MIB, for example, indicated by the third bit in the $k_{SSB}$. Optionally, when the value indicated by $k_{SSB}$ is less than the first preset value, the QCL hypothesis indication information is indicated by 4-bit subcarrier offset indication information in the MIB, for example, indicated by the third bit in the $k_{SSB}$ indication information.

Optionally, the QCL hypothesis indication information is indicated by 1-bit TypeA DMRS position indication information in the MIB. Since the TypeA DMRS position indication information is mainly used for information transmission in the initial access stage, the main purpose of considering configuring the TypeA DMRS position indication information is to be coexist with the LTE system. In the first frequency range, because there is no need to be coexist with the LTE system, TypeA DMRS configuration may not be supported. Correspondingly, the TypeA DMRS position indication information may be used to indicate other information, for example, to indicate the QCL hypothesis indication information.

Optionally, the QCL hypothesis indication information is indicated by at least 1 bit in the 8-bit SIB1 PDCCH configuration information in the MIB. Since there may be some redundant states in the SIB1 PDCCH configuration in the first frequency range, these redundant states when indicating the SIB1 PDCCH configuration may be used to indicate other information, for example, to indicate the QCL hypothesis indication information. Optionally, the above at least 1 bit may include the lowest order bit (that is, the 8th bit) in the 8-bit SIB1 PDCCH configuration information, and/or, the above at least 1 bit may include the highest order bit in the 8-bit SIB1 PDCCH configuration information (that is, the first bit), and/or, the above at least one bit may include the 5th bit in the 8-bit SIB1 PDCCH configuration information, and/or, the above at least one bit may include the 4th bit in the 8-bit SIB1 PDCCH configuration information.

Optionally, the QCL hypothesis indication information is indicated by 1 spare bit in the MIB.

Optionally, the QCL hypothesis indication information is indicated by 1-bit MIB message type indication information.

Optionally, the QCL hypothesis indication information is indicated by half frame indication information $a_{A+4}$ in the PBCH information bit(s).

For a case that the QCL hypothesis indication information occupies 2 bits, the bits occupied by the QCL hypothesis indication information include 2 bits determined according to at least one of the foregoing situations.

As an example, in the case that the QCL hypothesis indication information occupies 2 bits, 1 bit is the common subcarrier spacing indication information, such as subCarrierSpacingCommon; the other 1 bit is the low order bit in $k_{SSB}$. Optionally, when the value indicated by $k_{SSB}$ is less than 12, the common subcarrier spacing indication information and the low order bit in the 4-bit $k_{SSB}$ are used to jointly indicate the QCL hypothesis indication information.

As an example, in the case that the QCL hypothesis indication information occupies 2 bits, 1 bit is the common subcarrier spacing indication information, such as subCarrierSpacingCommon; the other 1 bit is the TypeA DMRS position indication information.

As an example, in the case that the QCL hypothesis indication information occupies 2 bits, the 2 bits are the lowest two bits (i.e., the 3rd bit and the 4th bit) in the $k_{SSB}$. Optionally, when the value indicated by the $k_{SSB}$ is less than 12, the lowest two bits in the 4-bit $k_{SSB}$ are used to jointly indicate the QCL hypothesis indication information.

For the case that the QCL hypothesis indication information occupies 1 bit, the bit occupied by the QCL hypothesis indication information includes 1 bit determined according to one of the foregoing situations.

As an example, in the case that the QCL hypothesis indication information occupies 1 bit, the QCL hypothesis indication information is indicated by common subcarrier spacing indication information, for example, indicated by subCarrierSpacingCommon.

As an example, in the case that the QCL hypothesis indication information occupies 1 bit, when the value indicated by $k_{SSB}$ is less than 12, the QCL hypothesis indication information is indicated by a low order bit in the $k_{SSB}$ indication information.

As an example, in the case that the QCL hypothesis indication information occupies 1 bit, the QCL hypothesis indication information is indicated by the lowest bit (that is, the 8th bit) among the 8 bits included in the SIB1 PDCCH configuration information.

As an example, in the case that the QCL hypothesis indication information occupies 1 bit, the QCL hypothesis indication information is indicated by the 5th bit among the 8 bits included in the SIB1 PDCCH configuration information.

Before further introducing and explaining the technical solutions provided by the embodiments of the present disclosure, the following assumptions are made: the first subcarrier spacing refers to the subcarrier spacing corresponding to the first SSB transmission; the second subcarrier spacing refers to the subcarrier spacing corresponding to the first information transmission, the first information is associated with the first SSB, and the first information includes at least one of the following: SIB1, message 2 or message 4 transmitted during the initial access procedure, a paging message, and a system message. It should be understood that the following embodiments are based on the above assumptions.

Optionally, there is an association relationship between the number of bits occupied by the QCL hypothesis indication information and the first subcarrier spacing or the second subcarrier spacing; and/or, there is an association relationship between the second information and the first subcarrier spacing or the second subcarrier spacing.

Based on this, in a case that there is an association relationship between the QCL hypothesis indication information and the first subcarrier spacing, if the first subcarrier spacing is different, the number of bits included in the QCL hypothesis indication information is different. In a case that there is an association relationship between the second information and the first subcarrier spacing, if the first subcarrier spacing is different, the information field (second information) reused by the QCL hypothesis indication information is different. In a case that there is an association relationship between the QCL hypothesis indication information and the second subcarrier spacing, if the second subcarrier spacing is different, the number of bits included in the QCL hypothesis indication information is different. In a case that there is an association relationship between the second information and the second subcarrier spacing, if the second subcarrier spacing is different, the information field reused by the QCL hypothesis indication information is different. In a case that there is an association between the QCL hypothesis indication information and a combination of the first subcarrier spacing and the second subcarrier spacing, if the combination of the first subcarrier spacing and the second subcarrier spacing is different, the number of the bits included in the QCL hypothesis indication information is different. In a case that there is an association relationship between the second information and a combination of the first subcarrier spacing and the second subcarrier spacing, if the combination of the first subcarrier spacing and the second subcarrier spacing is different, the information field reused by the QCL hypothesis indication information is different.

Optionally, for a terminal device in the connected state, the network device may also indicate the QCL relationship of the SSB through the configuration information of the serving cell, or the network device may also indicate the QCL relationship of the corresponding SSB when the terminal device performs a Radio Resource Management (RRM) measurement.

Based on the design of the PBCH in the first frequency range, the following exemplarily shows a manner of determining a parameter used by the terminal device in the initial access procedure.

In the Band M1 frequency band included in the first frequency range, the subcarrier spacing (the first subcarrier spacing) corresponding to SSB transmission is predefined as 120 KHz, the subcarrier spacing (second subcarrier spacing) corresponding to transmission of SIB1, the message 2 or message 4 for initial access (Msg.2/4), the paging message and the system message or the like is the same as the first subcarrier spacing, that is, the second subcarrier spacing is also 120 KHz.

When the $k_{SSB}$ indication information is used to indicate the offset between subcarrier 0 in the second CRB and subcarrier 0 of the first RB of the SSB in number of subcarriers, the valid indication values of $k_{SSB}$ are 0, 1, 2, 3, 4, 5, 6, 7, 8, 9, 10, 11.

The QCL hypothesis indication information (Q) includes 1 bit, and the value indicated by Q is 32 or 64. The QCL hypothesis indication information reuses the 1-bit common subcarrier spacing indication information in the MIB, as shown in Table 6 below.

TABLE 6

| QCL hypothesis indication information | |
|---|---|
| Common subcarrier spacing indication information | QCL hypothesis indication |
| scs15or60 | 32 |
| scs30or120 | 64 |

It should be noted that the various embodiments described in the present disclosure and/or the technical features in the embodiments can be combined with each other arbitrarily if such combination will not cause conflict, and the technical solutions obtained after the combination should also fall within the protection scope of the present disclosure.

Another point that needs to be explained is that, embodiments described in the present disclosure and/or the technical features in the embodiments can be combined with the prior art arbitrarily if such combination will not cause conflict, and the technical solutions obtained after the combination should also fall within the protection scope of the present disclosure.

It should be understood that in various embodiments of the present disclosure, the serial numbers of processes do not mean the order of execution, and the execution order of the processes should be determined by their functions and internal logic, and such numbers should not be construed as constituting any limitation on the implementation procedures of the embodiments of the present disclosure.

It should also be noted that, in the information determination method at the terminal device side described in the above embodiments, respective steps performed by the network device may be independently implemented as an information transmission method at the network device side.

Figure 9:
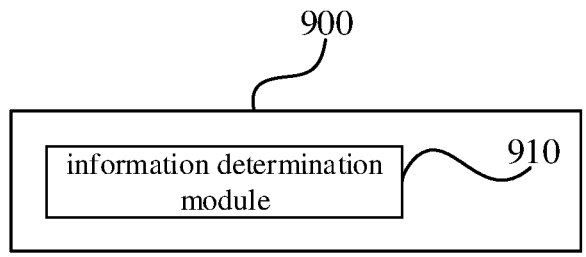
FIG. 9 is a block diagram of an information determination apparatus provided by an embodiment of the present disclosure.

FIG. 9 shows a block diagram of an information determination apparatus provided by an embodiment of the present disclosure. The apparatus has the functions of implementing the above example methods at the terminal device side, and the functions may be implemented by hardware, or may be implemented by executing corresponding software on the hardware. The apparatus may be the terminal device 10 above, or may be set in the terminal device 10. As shown in FIG. 9, the apparatus 900 may include: an information determining module 910.

The information determination module 910 is configured to, based on a first frequency range, determine information used by the terminal device in an initial access procedure.

In an example, a frequency in the first frequency range is greater than 52.6 GHz and/or equal to 52.6 GHz.

In an example, the first frequency range includes 52.6 GHz to 71 GHz.

In an example, the information used by the terminal device in the initial access procedure includes first subcarrier spacing;
wherein a first SSB is detected by the terminal device on a first frequency band, the first subcarrier spacing refers to subcarrier spacing corresponding to first SSB transmission, and the first frequency band belongs to the first frequency range.

In an example, the first subcarrier spacing is predefined by a communication protocol;
and/or,
the first subcarrier spacing is determined according to an association relationship, and the association relationship includes an association relationship between subcarrier spacing corresponding to SSB transmission and a frequency band in the first frequency range.

In an example, the first subcarrier spacing includes at least one of the following: 120 KHz, 240 KHz, 480 KHz, and 960 KHz.

In an example, the information used by the terminal device in the initial access procedure includes second subcarrier spacing;
wherein the second subcarrier spacing refers to subcarrier spacing corresponding to first information transmission, the first information is associated with a first SSB, the first SSB is an SSB detected by the terminal device on a first frequency band, the first frequency band belongs to the first frequency range; the first information includes at least one of the following: SIB1, a message 2 or a message 4 transmitted during the initial access procedure, a paging message, and a system message.

In an example, the second subcarrier spacing is predefined by a communication protocol;
and/or,
the second subcarrier spacing is determined based on at least one of the following information: first subcarrier spacing, the first frequency band, and first indication information; wherein the first subcarrier spacing refers to subcarrier spacing corresponding to first SSB transmission.

In an example, the first indication information includes at least one of the following: common subcarrier spacing indication information, and other information carried in a PBCH in the first SSB.

In an example, the other information includes at least one of the following: TypeA DMRS position indication information, SIB1 PDCCH configuration information, subcarrier offset indication information, a spare bit, MIB message type indication information, and half frame indication information.

In an example, the second subcarrier spacing includes at least one of the following: 120 KHz, 240 KHz, 480 KHz, and 960 KHz.

In an example, the information used by the terminal device in the initial access procedure includes subcarrier offset indication information;
wherein the subcarrier offset indication information is carried in a PBCH in a first SSB, the first SSB is an SSB detected by the terminal device on a first frequency band, and the first frequency band belongs to the first frequency range; the subcarrier offset indication information is used to indicate the offset between a subcarrier 0 of a second CRB and a subcarrier 0 of the first Resource Block (RB) of the first SSB in number of subcarriers, a center of the subcarrier 0 of the second CRB coincides with a center of the subcarrier 0 of the first CRB, and the first CRB overlaps with the subcarrier 0 of the first RB of the first SSB.

In an example, subcarrier spacing corresponding to the subcarrier offset indication information is predefined by a communication protocol;
or,
the subcarrier spacing corresponding to the subcarrier offset indication information is equal to first subcarrier spacing;
or,
the subcarrier spacing corresponding to the subcarrier offset indication information is equal to second subcarrier spacing;

wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, subcarrier spacing corresponding to the first CRB is predefined by a communication protocol;
or,
the subcarrier spacing corresponding to the first CRB is equal to the subcarrier spacing corresponding to the subcarrier offset indication information;
or,
the subcarrier spacing corresponding to the first CRB is equal to first subcarrier spacing;
or,
the subcarrier spacing corresponding to the first CRB is equal to second subcarrier spacing;
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, subcarrier spacing corresponding to the second CRB is predefined by a communication protocol;
or,
the subcarrier spacing corresponding to the second CRB is equal to the subcarrier spacing corresponding to the first CRB;
or,
the subcarrier spacing corresponding to the second CRB is equal to the subcarrier spacing corresponding to the subcarrier offset indication information;
or,
the subcarrier spacing corresponding to the second CRB is equal to first subcarrier spacing;
or,
the subcarrier spacing corresponding to the second CRB is equal to second subcarrier spacing;
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, the subcarrier spacing corresponding to the second CRB is equal to the subcarrier spacing corresponding to the first CRB, and the second CRB and the first CRB are the same CRB.

In an example, in a case where the first subcarrier spacing and the second subcarrier spacing are the same, a range corresponding to the number of subcarriers of offset indicated by the subcarrier offset indication information includes one of the following situations:
$\{0, 1, 2, 3, 4, 5, 6, 7, 8, 9, 10, 11\}$;
$\{0, 2, 4, 6, 8, 10\}$;
$\{0, 4, 8\}$;
$\{1, 3, 5, 7, 9, 11\}$;
$\{3, 7, 11\}$;
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, in a case where the first subcarrier spacing is greater than the second subcarrier spacing and a ratio of the first subcarrier spacing to the second subcarrier spacing is N1, a range corresponding to the number of subcarriers of the offset indicated by the subcarrier offset indication information includes one of the following situations:
$\{0, N1, 2*N1, \ldots, (M1-1)*N1\}$, wherein $M1*N1=m*12$, and m is the smallest positive integer satisfying $M1*N1=m*12$;
$\{0, 2, 4, 6, 8, 10\}$;
$\{0, 4, 8\}$;
$\{1, 3, 5, 7, 9, 11\}$;
$\{3, 7, 11\}$;
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, in a case where the first subcarrier spacing is smaller than the second subcarrier spacing and a ratio of the second subcarrier spacing to the first subcarrier spacing is N 2, a range corresponding to the number of subcarriers of the offset indicated by the subcarrier offset indication information includes one of the following situations:
$\{0, 1, 2, \ldots, 12*N2-1\}$;
$\{0, 1, 2, 3, 4, 5, 6, 7, 8, 9, 10, 11\}$;
$\{0, 2, 4, 6, 8, 10\}$;
$\{0, 4, 8\}$;
$\{1, 3, 5, 7, 9, 11\}$;
$\{3, 7, 11\}$;
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, in a case where the first subcarrier spacing is smaller than the second subcarrier spacing and a ratio of the second subcarrier spacing to the first subcarrier spacing is N 2, a subcarrier index range in one RB corresponding to subcarrier 0 of the first RB of the first SSB includes one of the following situations:
$\{0, 1, 2, 3, 4, 5, 6, 7, 8, 9, 10, 11\}$;
$\{0, N2, 2*N2, \ldots, (M2-1)*N2\}$, wherein $M2*N2=n*12$, and n is the smallest positive integer satisfying $M2*N2=n*12$;
$\{0, 2, 4, 6, 8, 10\}$;
$\{0, 4, 8\}$;
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, the information used by the terminal device in the initial access procedure includes QCL hypothesis indication information.

In an example, the QCL hypothesis indication information is predefined by a communication protocol;
or,
the QCL hypothesis indication information is indicated by second information carried in a PBCH in a first SSB.

In an example, the second information includes at least one of the following: third information in MIB, MIB message type indication information, and half-frame indication information;
wherein the third information includes at least one of the following information: common subcarrier spacing indication information, subcarrier offset indication information, TypeA DMRS position indication information, SIB1 PDCCH configuration information, and a spare bit.

In an example, there is an association relationship between the number of bits occupied by the QCL hypothesis indication information and first subcarrier spacing or second subcarrier spacing;
and/or,
there is an association relationship between the second information and the first subcarrier spacing or the second subcarrier spacing;
wherein the first SSB is detected by the terminal device on a first frequency band, the first subcarrier spacing refers to subcarrier spacing corresponding to first SSB transmission, the first frequency band belongs to the first frequency range; the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and system message.

In an example, the QCL hypothesis indication information occupies 1 bit, or the QCL hypothesis indication information occupies 2 bits.

In view of the above, in the technical solutions provided by embodiments of the present disclosure, by designing the information transmission in the PBCH on a high frequency band, during the initial access procedure, the network device sends information such as SSB or SIB1 to the terminal device based on the high frequency band, so that the terminal device, based on the high frequency band, determines information used in the initial access procedure, such as, determining the subcarrier spacing corresponding to SSB transmission, the subcarrier spacing corresponding to SIB1 transmission, subcarrier offset indication information, QCL hypothesis indication information, etc., and thus the terminal device subsequently uses the information to access the network device, to realize information interaction with the network device on the high frequency band.

Figure 10:
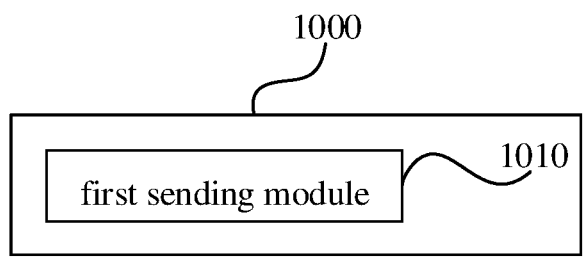
FIG. 10 is a block diagram of an information transmission apparatus provided by an embodiment of the present disclosure.

FIG. 10 shows a block diagram of an information transmission apparatus provided by an embodiment of the present disclosure. The apparatus has the functions of implementing the above example methods at the network device side, and the functions may be implemented by hardware, or may be implemented by executing corresponding software on the hardware. The apparatus may be the network device 20 above, or may be set in the network device 20. As shown in FIG. 10, the apparatus 1000 may include: a first sending module 1010.

The first sending module 1010 is configured to send a first SSB to a terminal device via a first frequency band, wherein the first frequency band belongs to a first frequency range.

In an example, a frequency in the first frequency range is greater than 52.6 GHz and/or equal to 52.6 GHz.

In an example, the first frequency range includes 52.6 GHz to 71 GHz.

In an example, subcarrier spacing corresponding to first SSB transmission is first subcarrier spacing;
wherein:
the first subcarrier spacing is predefined by a communication protocol;
and/or,
the first subcarrier spacing is determined according to an association relationship, and the association relationship includes an association relationship between subcarrier spacing corresponding to SSB transmission and a frequency band in the first frequency range.

In an example, subcarrier spacing corresponding to first SSB transmission is first subcarrier spacing;
wherein the first subcarrier spacing includes at least one of the following: 120 KHz, 240 KHz, 480 KHz, and 960 KHz.

Figure 11:
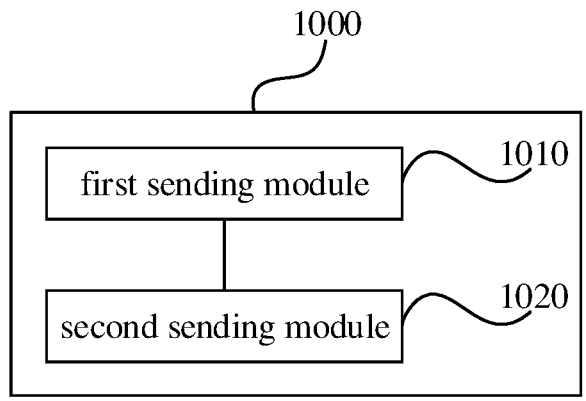
FIG. 11 is a block diagram of an information transmission apparatus provided in another embodiment of the present disclosure.

In an example, as shown in FIG. 11, the apparatus 1000 further includes a second sending module 1020.

The second sending module 1020 is configured to send, via the first frequency band, first information to the terminal device, wherein the first information is associated with the first SSB;
wherein the first information includes at least one of the following: SIB1, a message 2 or a message 4 transmitted during the initial access procedure, a paging message, and a system message.

In an example, subcarrier spacing corresponding to first information transmission is second subcarrier spacing:
the second subcarrier spacing is predefined by a communication protocol;
and/or,
the second subcarrier spacing is determined based on at least one of the following information: first subcarrier spacing, the first frequency band, and first indication information; wherein the first subcarrier spacing refers to subcarrier spacing corresponding to first SSB transmission.

In an example, the first indication information includes at least one of the following: common subcarrier spacing indication information, and other information carried in a PBCH in the first SSB.

In an example, the other information includes at least one of the following: TypeA DMRS position indication information, SIB1 PDCCH configuration information, subcarrier offset indication information, a spare bit, MIB message type indication information, and half frame indication information.

In an example, the second subcarrier spacing includes at least one of the following: 120 KHz, 240 KHz, 480 KHz, and 960 KHz.

In an example, subcarrier offset indication information is carried in a PBCH in the first SSB;
wherein the subcarrier offset indication information is used to indicate an offset between a subcarrier 0 of a second CRB and a subcarrier 0 of the first Resource Block (RB) of the first SSB in number of subcarriers, a center of the subcarrier 0 of the second CRB coincides with a center of the subcarrier 0 of the first CRB, and the first CRB overlaps with the subcarrier 0 of the first RB of the first SSB.

In an example, subcarrier spacing corresponding to the subcarrier offset indication information is predefined by a communication protocol;

or, the subcarrier spacing corresponding to the subcarrier offset indication information is equal to first subcarrier spacing;

or, the subcarrier spacing corresponding to the subcarrier offset indication information is equal to second subcarrier spacing;

wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, subcarrier spacing corresponding to the first CRB is predefined by a communication protocol;

or, the subcarrier spacing corresponding to the first CRB is equal to the subcarrier spacing corresponding to the subcarrier offset indication information;

or, the subcarrier spacing corresponding to the first CRB is equal to first subcarrier spacing;

or, the subcarrier spacing corresponding to the first CRB is equal to second subcarrier spacing;

wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, subcarrier spacing corresponding to the second CRB is predefined by a communication protocol;

or, the subcarrier spacing corresponding to the second CRB is equal to the subcarrier spacing corresponding to the first CRB;

or, the subcarrier spacing corresponding to the second CRB is equal to the subcarrier spacing corresponding to the subcarrier offset indication information;

or, the subcarrier spacing corresponding to the second CRB is equal to first subcarrier spacing;

or, the subcarrier spacing corresponding to the second CRB is equal to second subcarrier spacing;

wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, the subcarrier spacing corresponding to the second CRB is equal to the subcarrier spacing corresponding to the first CRB, and the second CRB and the first CRB are the same CRB.

In an example, in a case where the first subcarrier spacing and the second subcarrier spacing are the same, a range corresponding to the number of subcarriers of the offset indicated by the subcarrier offset indication information includes one of the following situations:

{0, 1, 2, 3, 4, 5, 6, 7, 8, 9, 10, 11};
{0, 2, 4, 6, 8, 10};
{0, 4, 8};
{1, 3, 5, 7, 9, 11};
{3, 7, 11};

wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, in a case where the first subcarrier spacing is greater than the second subcarrier spacing and a ratio of the first subcarrier spacing to the second subcarrier spacing is N1, a range corresponding to the number of subcarriers of the offset indicated by the subcarrier offset indication information includes one of the following situations:

$\{0, N1, 2*N1, \ldots, (M1-1)*N1\}$, wherein $M1*N1=m*12$, and m is the smallest positive integer satisfying $M1*N1=m*12$;
{0, 2, 4, 6, 8, 10};
{0, 4, 8};
{1, 3, 5, 7, 9, 11};
{3, 7, 11};

wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, in a case where the first subcarrier spacing is smaller than the second subcarrier spacing and a ratio of the second subcarrier spacing to the first subcarrier spacing is N 2, a range corresponding to the number of subcarriers of the offset indicated by the subcarrier offset indication information includes one of the following situations:

$\{0, 1, 2, \ldots, 12*N2-1\}$;
{0, 1, 2, 3, 4, 5, 6, 7, 8, 9, 10, 11};
{0, 2, 4, 6, 8, 10};
{0, 4, 8};
{1, 3, 5, 7, 9, 11};
{3, 7, 11};

wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, in a case where the first subcarrier spacing is smaller than the second subcarrier spacing and a ratio of the second subcarrier spacing to the first subcarrier spacing is N 2, a subcarrier index range in one RB corresponding to subcarrier 0 of the first RB of the first SSB includes one of the following situations:

{0, 1, 2, 3, 4, 5, 6, 7, 8, 9, 10, 11};
{0, N2, 2*N2, . . . , (M2−1)*N2}, wherein M2*N2=n*12, and n is the smallest positive integer satisfying M2*N 2=n*12;
{0, 2, 4, 6, 8, 10};
{0, 4, 8};
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, second information carried in a PBCH in the first SSB is used to indicate QCL hypothesis indication information.

In an example, the second information includes at least one of the following: third information in MIB, MIB message type indication information, and half-frame indication information;
wherein the third information includes at least one of the following information: common subcarrier spacing indication information, subcarrier offset indication information, TypeA DMRS position indication information, SIB1 PDCCH configuration information, and a spare bit.

In an example, there is an association relationship between the number of bits occupied by the QCL hypothesis indication information and first subcarrier spacing or second subcarrier spacing;
and/or,
there is an association relationship between the second information and the first subcarrier spacing or the second subcarrier spacing;
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and system message.

In an example, the QCL hypothesis indication information occupies 1 bit, or the QCL hypothesis indication information occupies 2 bits.

In view of the above, in the technical solutions provided by embodiments of the present disclosure, by designing the information transmission in the PBCH on a high frequency band, during the initial access procedure, the network device sends information such as SSB or SIB1 to the terminal device based on the high frequency band, so that the terminal device, based on the high frequency band, determines information used in the initial access procedure, such as, determining the subcarrier spacing corresponding to SSB transmission, the subcarrier spacing corresponding to SIB1 transmission, subcarrier offset indication information, QCL hypothesis indication information, etc., and thus the terminal device subsequently uses the information to access the network device, to realize information interaction with the network device on the high frequency band.

It should be noted that when the apparatuses provided by the above embodiments realizes their functions, the division of the above-mentioned functional modules is used as an example for illustration. In practical applications, the above-mentioned function allocation can be completed by different functional modules according to actual needs. That is, the content structures of the apparatuses may be divided into different functional modules to complete all or part of the functions described above.

Regarding the apparatuses in the foregoing embodiments, the specific manner in which each module performs operations has been described in detail in the embodiments related to the methods, and detailed descriptions will be omitted here.

Figure 12:
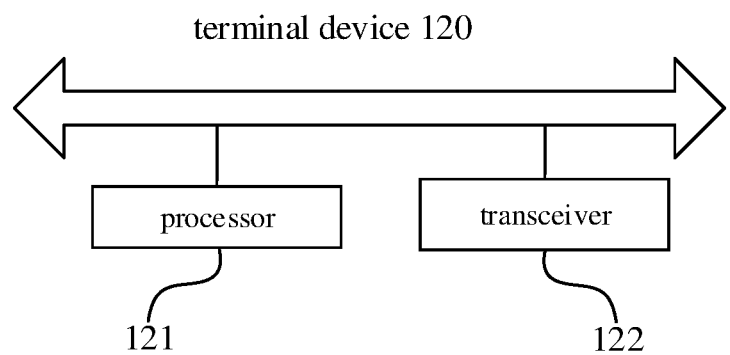
FIG. 12 is a block diagram of a terminal device provided by an embodiment of the present disclosure.

FIG. 12 shows a schematic structural diagram of a terminal device 120 provided by an embodiment of the present disclosure. For example, the terminal device may be used to perform the above-mentioned information determination methods at the terminal device side. Specifically, the terminal device 120 may include: a processor 121, and a transceiver 122 connected to the processor 121.

The processor 121 includes one or more processing cores, and the processor 121 executes various functional applications and information processing by running software programs and modules.

The transceiver 122 includes a receiver and a transmitter. Optionally, the transceiver 122 is a communication chip.

In an example, the terminal device 120 further includes: a memory and a bus. The memory is connected to the processor through the bus. The memory may be used to store a computer program, and the processor is used to execute the computer program, so as to implement various steps performed by the terminal device in the foregoing method embodiments.

In addition, the memory can be implemented by any type of volatile or non-volatile storage device or their combination, and the volatile or non-volatile storage device includes but not limited to: Random-Access Memory (RAM) and Read-Only Memory (ROM), Erasable Programmable Read-Only Memory (EPROM), Electrically Erasable Programmable Read-Only Memory (EEPROM), flash memory or other solid-state storage technology, Compact Disc Read-Only Memory (CD-ROM), Digital Video Disc (DVD, high-density digital video disc) or other optical storage, tape cartridge, tape, disk storage or other magnetic storage device.

The processor 121 is configured to, based on a first frequency range, determine information used by the terminal device in an initial access procedure.

In an example, a frequency in the first frequency range is greater than 52.6 GHz and/or equal to 52.6 GHz.

In an example, the first frequency range includes 52.6 GHz to 71 GHz.

In an example, the information used by the terminal device in the initial access procedure includes first subcarrier spacing;
wherein a first SSB is detected by the terminal device on a first frequency band, the first subcarrier spacing refers to subcarrier spacing corresponding to first SSB transmission, and the first frequency band belongs to the first frequency range.

In an example, the first subcarrier spacing is predefined by a communication protocol;
and/or,
the first subcarrier spacing is determined according to an association relationship, and the association relationship includes an association relationship between subcarrier spacing corresponding to SSB transmission and a frequency band in the first frequency range.

In an example, the first subcarrier spacing includes at least one of the following: 120 KHz, 240 KHz, 480 KHz, and 960 KHz.

In an example, the information used by the terminal device in the initial access procedure includes second subcarrier spacing;
wherein the second subcarrier spacing refers to subcarrier spacing corresponding to first information transmission, the first information is associated with a first SSB, the first SSB is an SSB detected by the terminal device on a first frequency band, the first frequency band belongs to the first frequency range; the first information includes at least one of the following: SIB1, a message 2 or a message 4 transmitted during the initial access procedure, a paging message, and a system message.

In an example, the second subcarrier spacing is predefined by a communication protocol;
and/or,
the second subcarrier spacing is determined based on at least one of the following information: first subcarrier spacing, the first frequency band, and first indication information; wherein the first subcarrier spacing refers to subcarrier spacing corresponding to first SSB transmission.

In an example, the first indication information includes at least one of the following: common subcarrier spacing indication information, and other information carried in a PBCH in the first SSB.

In an example, the other information includes at least one of the following: TypeA DMRS position indication information, SIB1 PDCCH configuration information, subcarrier offset indication information, a spare bit, MIB message type indication information, and half frame indication information.

In an example, the second subcarrier spacing includes at least one of the following: 120 KHz, 240 KHz, 480 KHz, and 960 KHz.

In an example, the information used by the terminal device in the initial access procedure includes subcarrier offset indication information;
wherein the subcarrier offset indication information is carried in a PBCH in a first SSB, the first SSB is an SSB detected by the terminal device on a first frequency band, and the first frequency band belongs to the first frequency range; the subcarrier offset indication information is used to indicate the offset between a subcarrier 0 of a second CRB and a subcarrier 0 of the first Resource Block (RB) of the first SSB in number of subcarriers, a center of the subcarrier 0 of the second CRB coincides with a center of the subcarrier 0 of the first CRB, and the first CRB overlaps with the subcarrier 0 of the first RB of the first SSB.

In an example, subcarrier spacing corresponding to the subcarrier offset indication information is predefined by a communication protocol;
or,
the subcarrier spacing corresponding to the subcarrier offset indication information is equal to first subcarrier spacing;
or,
the subcarrier spacing corresponding to the subcarrier offset indication information is equal to second subcarrier spacing;
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, subcarrier spacing corresponding to the first CRB is predefined by a communication protocol;
or,
the subcarrier spacing corresponding to the first CRB is equal to the subcarrier spacing corresponding to the subcarrier offset indication information;
or,
the subcarrier spacing corresponding to the first CRB is equal to first subcarrier spacing;
or,
the subcarrier spacing corresponding to the first CRB is equal to second subcarrier spacing;
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, subcarrier spacing corresponding to the second CRB is predefined by a communication protocol;
or,
the subcarrier spacing corresponding to the second CRB is equal to the subcarrier spacing corresponding to the first CRB;
or,
the subcarrier spacing corresponding to the second CRB is equal to the subcarrier spacing corresponding to the subcarrier offset indication information;
or,
the subcarrier spacing corresponding to the second CRB is equal to first subcarrier spacing;
or,
the subcarrier spacing corresponding to the second CRB is equal to second subcarrier spacing;
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, the subcarrier spacing corresponding to the second CRB is equal to the subcarrier spacing corresponding to the first CRB, and the second CRB and the first CRB are the same CRB.

In an example, in a case where the first subcarrier spacing and the second subcarrier spacing are the same, a range corresponding to the number of subcarriers of offset indicated by the subcarrier offset indication information includes one of the following situations:

{0, 1, 2, 3, 4, 5, 6, 7, 8, 9, 10, 11};
{0, 2, 4, 6, 8, 10};
{0, 4, 8};
{1, 3, 5, 7, 9, 11};
{3, 7, 11};
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, in a case where the first subcarrier spacing is greater than the second subcarrier spacing and a ratio of the first subcarrier spacing to the second subcarrier spacing is N1, a range corresponding to the number of subcarriers of offset indicated by the subcarrier offset indication information includes one of the following situations:

{0, N1, 2*N1, . . . , (M1−1)*N1}, wherein M1*N1=m*12, and m is the smallest positive integer satisfying M1*N1=m*12;
{0, 2, 4, 6, 8, 10};
{0, 4, 8};
{1, 3, 5, 7, 9, 11};
{3, 7, 11};
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, in a case where the first subcarrier spacing is smaller than the second subcarrier spacing and a ratio of the second subcarrier spacing to the first subcarrier spacing is N 2, a range corresponding to the number of subcarriers of offset indicated by the subcarrier offset indication information includes one of the following situations:

{0, 1, 2, . . . , 12*N2-1};
{0, 1, 2, 3, 4, 5, 6, 7, 8, 9, 10, 11};
{0, 2, 4, 6, 8, 10};
{0, 4, 8};
{1, 3, 5, 7, 9, 11};
{3, 7, 11};
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, in a case where the first subcarrier spacing is smaller than the second subcarrier spacing and a ratio of the second subcarrier spacing to the first subcarrier spacing is N 2, a subcarrier index range in one RB corresponding to subcarrier 0 of the first RB of the first SSB includes one of the following situations:

{0, 1, 2, 3, 4, 5, 6, 7, 8, 9, 10, 11};
{0, N2, 2*N2, . . . , (M2−1)*N2}, wherein M2*N2=n*12, and n is the smallest positive integer satisfying M2*N 2=n*12;
{0, 2, 4, 6, 8, 10};
{0, 4, 8};
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, the information used by the terminal device in the initial access procedure includes QCL hypothesis indication information.

In an example, the QCL hypothesis indication information is predefined by a communication protocol;
or,
the QCL hypothesis indication information is indicated by second information carried in a PBCH in a first SSB.

In an example, the second information includes at least one of the following: third information in MIB, MIB message type indication information, and half-frame indication information;
wherein the third information includes at least one of the following information: common subcarrier spacing indication information, subcarrier offset indication information, TypeA DMRS position indication information, SIB1 PDCCH configuration information, and a spare bit.

In an example, there is an association relationship between the number of bits occupied by the QCL hypothesis indication information and first subcarrier spacing or second subcarrier spacing;
and/or,
there is an association relationship between the second information and the first subcarrier spacing or the second subcarrier spacing;
wherein the first SSB is detected by the terminal device on a first frequency band, the first subcarrier spacing refers to subcarrier spacing corresponding to first SSB transmission, the first frequency band belongs to the first frequency range; the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and system message.

In an example, the QCL hypothesis indication information occupies 1 bit, or the QCL hypothesis indication information occupies 2 bits.

Figure 13:
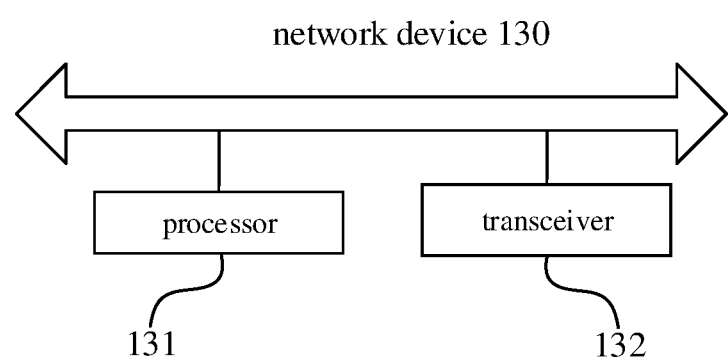
FIG. 13 is a block diagram of a network device provided by an embodiment of the present disclosure.

FIG. 13 shows a schematic structural diagram of a network device 130 provided by an embodiment of the present disclosure. For example, the network device may be used to perform the above-mentioned information transmission methods at the terminal device side. Specifically, the network device 130 may include: a processor 131, and a transceiver 132 connected to the processor 131.

The processor 131 includes one or more processing cores, and the processor 131 executes various functional applications and information processing by running software programs and modules.

The transceiver 132 includes a receiver and a transmitter. Optionally, the transceiver 132 is a communication chip.

In an example, the network device 130 further includes: a memory and a bus. The memory is connected to the processor through the bus. The memory may be used to store a computer program, and the processor is used to execute the computer program, so as to implement various steps performed by the network device in the foregoing method embodiments.

In addition, the memory can be implemented by any type of volatile or non-volatile storage device or their combination, and the volatile or non-volatile storage device includes but not limited to: Random-Access Memory (RAM) and Read-Only Memory (ROM), Erasable Programmable Read-Only Memory (EPROM), Electrically Erasable Programmable Read-Only Memory (EEPROM), flash memory or other solid-state storage technology, Compact Disc Read-Only Memory (CD-ROM), Digital Video Disc (DVD, high-density digital video disc) or other optical storage, tape cartridge, tape, disk storage or other magnetic storage device.

The transceiver 132 is configured to send a first SSB to a terminal device via a first frequency band, wherein the first frequency band belongs to a first frequency range.

In an example, a frequency in the first frequency range is greater than 52.6 GHz and/or equal to 52.6 GHz.

In an example, the first frequency range includes 52.6 GHz to 71 GHz.

In an example, subcarrier spacing corresponding to first SSB transmission is first subcarrier spacing;
wherein:
the first subcarrier spacing is predefined by a communication protocol;
and/or,
the first subcarrier spacing is determined according to an association relationship, and the association relationship includes an association relationship between subcarrier spacing corresponding to SSB transmission and a frequency band in the first frequency range.

In an example, subcarrier spacing corresponding to first SSB transmission is first subcarrier spacing;
wherein the first subcarrier spacing includes at least one of the following: 120 KHz, 240 KHz, 480 KHz, and 960 KHz.

In an example, the transceiver 132 is further configured to send, via the first frequency band, first information to the terminal device, wherein the first information is associated with the first SSB;
wherein the first information includes at least one of the following: SIB1, a message 2 or a message 4 transmitted during the initial access procedure, a paging message, and a system message.

In an example, subcarrier spacing corresponding to first information transmission is second subcarrier spacing:
the second subcarrier spacing is predefined by a communication protocol;
and/or,
the second subcarrier spacing is determined based on at least one of the following information: first subcarrier spacing, the first frequency band, and first indication information; wherein the first subcarrier spacing refers to subcarrier spacing corresponding to first SSB transmission.

In an example, the first indication information includes at least one of the following: common subcarrier spacing indication information, and other information carried in a PBCH in the first SSB.

In an example, the other information includes at least one of the following: TypeA DMRS position indication information, SIB1 PDCCH configuration information, subcarrier offset indication information, a spare bit, MIB message type indication information, and half frame indication information.

In an example, the second subcarrier spacing includes at least one of the following: 120 KHz, 240 KHz, 480 KHz, and 960 KHz.

In an example, subcarrier offset indication information is carried in a PBCH in the first SSB;
wherein the subcarrier offset indication information is used to indicate the offset between a subcarrier 0 of a second CRB and a subcarrier 0 of the first Resource Block (RB) of the first SSB in number of subcarriers, a center of the subcarrier 0 of the second CRB coincides with a center of the subcarrier 0 of the first CRB, and the first CRB overlaps with the subcarrier 0 of the first RB of the first SSB.

In an example, subcarrier spacing corresponding to the subcarrier offset indication information is predefined by a communication protocol;
or,
the subcarrier spacing corresponding to the subcarrier offset indication information is equal to first subcarrier spacing;
or,
the subcarrier spacing corresponding to the subcarrier offset indication information is equal to second subcarrier spacing;
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, subcarrier spacing corresponding to the first CRB is predefined by a communication protocol;
or,
the subcarrier spacing corresponding to the first CRB is equal to the subcarrier spacing corresponding to the subcarrier offset indication information;
or,
the subcarrier spacing corresponding to the first CRB is equal to first subcarrier spacing;
or,
the subcarrier spacing corresponding to the first CRB is equal to second subcarrier spacing;
wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, subcarrier spacing corresponding to the second CRB is predefined by a communication protocol;
or, the subcarrier spacing corresponding to the second CRB is equal to the subcarrier spacing corresponding to the first CRB;

or, the subcarrier spacing corresponding to the second CRB is equal to the subcarrier spacing corresponding to the subcarrier offset indication information;

or, the subcarrier spacing corresponding to the second CRB is equal to first subcarrier spacing;

or, the subcarrier spacing corresponding to the second CRB is equal to second subcarrier spacing;

wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, the subcarrier spacing corresponding to the second CRB is equal to the subcarrier spacing corresponding to the first CRB, and the second CRB and the first CRB are the same CRB.

In an example, in a case where the first subcarrier spacing and the second subcarrier spacing are the same, a range corresponding to the number of subcarriers of offset indicated by the subcarrier offset indication information includes one of the following situations:

$\{0, 1, 2, 3, 4, 5, 6, 7, 8, 9, 10, 11\}$;
$\{0, 2, 4, 6, 8, 10\}$;
$\{0, 4, 8\}$;
$\{1, 3, 5, 7, 9, 11\}$;
$\{3, 7, 11\}$;

wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, in a case where the first subcarrier spacing is greater than the second subcarrier spacing and a ratio of the first subcarrier spacing to the second subcarrier spacing is N1, a range corresponding to the number of subcarriers of offset indicated by the subcarrier offset indication information includes one of the following situations:

$\{0, N1, 2*N1, \ldots, (M1-1)*N1\}$, wherein $M1*N1=m*12$, and m is the smallest positive integer satisfying $M1*N1=m*12$;
$\{0, 2, 4, 6, 8, 10\}$;
$\{0, 4, 8\}$;
$\{1, 3, 5, 7, 9, 11\}$;
$\{3, 7, 11\}$;

wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, in a case where the first subcarrier spacing is smaller than the second subcarrier spacing and a ratio of the second subcarrier spacing to the first subcarrier spacing is N2, a range corresponding to the number of subcarriers of offset indicated by the subcarrier offset indication information includes one of the following situations:

$\{0, 1, 2, \ldots, 12*N2-1\}$;
$\{0, 1, 2, 3, 4, 5, 6, 7, 8, 9, 10, 11\}$;
$\{0, 2, 4, 6, 8, 10\}$;
$\{0, 4, 8\}$;
$\{1, 3, 5, 7, 9, 11\}$;
$\{3, 7, 11\}$;

wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, in a case where the first subcarrier spacing is smaller than the second subcarrier spacing and a ratio of the second subcarrier spacing to the first subcarrier spacing is N2, a subcarrier index range in one RB corresponding to subcarrier 0 of the first RB of the first SSB includes one of the following situations:

$\{0, 1, 2, 3, 4, 5, 6, 7, 8, 9, 10, 11\}$;
$\{0, N2, 2*N2, \ldots, (M2-1)*N2\}$, wherein $M2*N2=n*12$, and n is the smallest positive integer satisfying $M2*N2=n*12$;
$\{0, 2, 4, 6, 8, 10\}$;
$\{0, 4, 8\}$;

wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and a system message.

In an example, second information carried in a PBCH in the first SSB is used to indicate QCL hypothesis indication information.

In an example, the second information includes at least one of the following: third information in MIB, MIB message type indication information, and half-frame indication information;

wherein the third information includes at least one of the following information: common subcarrier spacing indication information, subcarrier offset indication information, TypeA DMRS position indication information, SIB1 PDCCH configuration information, and a spare bit.

In an example, there is an association relationship between the number of bits occupied by the QCL hypothesis indication information and first subcarrier spacing or second subcarrier spacing;

and/or, there is an association relationship between the second information and the first subcarrier spacing or the second subcarrier spacing;

wherein the first subcarrier spacing refers to subcarrier spacing corresponding to first SSB transmission, the second subcarrier spacing refers to subcarrier spacing corresponding to first information transmission, the first information is associated with the first SSB, and the first information includes at least one of the following: SIB1, a message 2 or a message 4 transmitted during the initial access procedure, a paging message, and system message.

In an example, the QCL hypothesis indication information occupies 1 bit, or the QCL hypothesis indication information occupies 2 bits.

An embodiment of the present disclosure also provides a computer-readable storage medium, where a computer program is stored in the storage medium. The computer program is used to be executed by a processor of a terminal device, so as to implement the information determination methods at the terminal device side as described above.

An embodiment of the present disclosure also provides a computer-readable storage medium, where a computer program is stored in the storage medium. The computer program is used to be executed by a processor of a network device, so as to implement the information transmission methods at the network device side as described above.

An embodiment of the present disclosure also provides a chip. The chip includes a programmable logic circuit and/or program instructions. When the chip is run on a terminal device, the above information determination methods at the terminal device side are performed.

An embodiment of the present disclosure also provides a chip. The chip includes a programmable logic circuit and/or program instructions. When the chip is run on a network device, the above information transmission methods at the network device side are performed.

An embodiment of the present disclosure further provides a computer program product. When the computer program product is run on a terminal device, the above information determination methods at the terminal device side are performed.

An embodiment of the present disclosure further provides a computer program product. When the computer program product is run on a network device, the above information transmission methods at the network device side are performed.

Those skilled in the art should be aware that, in the foregoing one or more examples, the functions described in the embodiments of the present disclosure may be implemented by hardware, software, firmware or any combination thereof. When implemented in software, the functions may be stored on a computer-readable medium or transmitted as one or more instructions or codes on a computer-readable medium. The computer-readable medium includes both computer storage medium and communication medium. The communication medium includes any medium that facilitates transfer of a computer program from one place to another. The storage medium may be any available medium that can be accessed by a general purpose or special purpose computer.

The above are only example embodiments of the present disclosure, and are not intended to limit the present disclosure. Any modifications, equivalent replacements, improvements, etc. made within the spirit and principles of the present disclosure should fall within the protection scope of the present disclosure.

What is claimed is:

1. An information determination method, applied in a terminal device, the method comprising:

based on a first frequency range, determining information used by the terminal device in an initial access procedure;

wherein the first frequency range comprises 52.6 GHz to 71 GHz;

wherein the information used by the terminal device in the initial access procedure comprises first subcarrier spacing;

wherein a first Synchronization Signal Block (SSB) is detected by the terminal device on a first frequency band, the first subcarrier spacing refers to subcarrier spacing corresponding to first SSB transmission, and the first frequency band belongs to the first frequency range; and wherein:

the first subcarrier spacing is predefined by a communication protocol;

or the first subcarrier spacing is determined according to an association relationship, and the association relationship comprises an association relationship between subcarrier spacing corresponding to SSB transmission and a frequency band in the first frequency range;

wherein the information used by the terminal device in the initial access procedure comprises subcarrier offset indication information; and wherein the subcarrier offset indication information is carried in a Physical Broadcast Channel (PBCH) in a first SSB, the first SSB is an SSB detected by the terminal device on the first frequency band, and the first frequency band belongs to the first frequency range; the subcarrier offset indication information is used to indicate an offset between a subcarrier 0 of a second Common Resource Block (CRB) and a subcarrier 0 of the first Resource Block (RB) of the first SSB in number of subcarriers, a center of the subcarrier 0 of the second CRB coincides with a center of the subcarrier 0 of a first CRB, and the first CRB overlaps with the subcarrier 0 of the first RB of the first SSB.

2. The method according to claim 1, wherein the information used by the terminal device in the initial access procedure further comprises second subcarrier spacing;

wherein the second subcarrier spacing refers to subcarrier spacing corresponding to first information transmission, the first information is associated with the first SSB; the first information comprises at least one of the following: System Information Block (SIB) 1, a message 2 or a message 4 transmitted during the initial access procedure, a paging message, or a system message; and wherein:

the second subcarrier spacing is predefined by a communication protocol;

or the second subcarrier spacing is determined based on at least one of the following information: first subcarrier spacing, the first frequency band, or first indication information.

3. The method according to claim 1, wherein:

subcarrier spacing corresponding to the subcarrier offset indication information is predefined by a communication protocol;

or, the subcarrier spacing corresponding to the subcarrier offset indication information is equal to first subcarrier spacing;

or, the subcarrier spacing corresponding to the subcarrier offset indication information is equal to second subcarrier spacing;

wherein the second subcarrier spacing refers to subcarrier spacing corresponding to first information transmission, the first information is associated with the first SSB, and the first information comprises at least one of the following: SIB1, a message 2 or a message 4 transmitted during the initial access procedure, a paging message, or a system message.

4. The method according to claim 1, wherein:
subcarrier spacing corresponding to the first CRB is predefined by a communication protocol;
or,
the subcarrier spacing corresponding to the first CRB is equal to the subcarrier spacing corresponding to the subcarrier offset indication information;
or,
the subcarrier spacing corresponding to the first CRB is equal to first subcarrier spacing;
or,
the subcarrier spacing corresponding to the first CRB is equal to second subcarrier spacing;
wherein the second subcarrier spacing refers to subcarrier spacing corresponding to first information transmission, the first information is associated with the first SSB, and the first information comprises at least one of the following: SIB1, a message 2 or a message 4 transmitted during the initial access procedure, a paging message, or a system message.

5. The method according to claim 1, wherein:
subcarrier spacing corresponding to the second CRB is predefined by a communication protocol;
or,
the subcarrier spacing corresponding to the second CRB is equal to the subcarrier spacing corresponding to the first CRB;
or,
the subcarrier spacing corresponding to the second CRB is equal to the subcarrier spacing corresponding to the subcarrier offset indication information;
or,
the subcarrier spacing corresponding to the second CRB is equal to first subcarrier spacing;
or,
the subcarrier spacing corresponding to the second CRB is equal to second subcarrier spacing;
wherein the second subcarrier spacing refers to subcarrier spacing corresponding to first information transmission, the first information is associated with the first SSB, and the first information comprises at least one of the following: SIB1, a message 2 or a message 4 transmitted during the initial access procedure, a paging message, or a system message.

6. The method according to claim 1, wherein the subcarrier spacing corresponding to the second CRB is equal to the subcarrier spacing corresponding to the first CRB, and the second CRB and the first CRB are the same CRB.

7. The method according to claim 1, wherein in response to the first subcarrier spacing and the second subcarrier spacing being the same, a range corresponding to the number of subcarriers of the offset indicated by the subcarrier offset indication information comprises one of the following situations:
{0, 1, 2, 3, 4, 5, 6, 7, 8, 9, 10, 11};
{0, 2, 4, 6, 8, 10};
{0, 4, 8};
{1, 3, 5, 7, 9, 11};
{3, 7, 11};

wherein the second subcarrier spacing refers to subcarrier spacing corresponding to first information transmission, the first information is associated with the first SSB, and the first information comprises at least one of the following: SIB1, a message 2 or a message 4 transmitted during the initial access procedure, a paging message, or a system message.

8. The method according to claim 1, wherein the information used by the terminal device in the initial access procedure further comprises Quasi-co-location (QCL) hypothesis indication information.

9. The method according to claim 8, wherein:
the QCL hypothesis indication information is predefined by a communication protocol;
or,
the QCL hypothesis indication information is indicated by second information carried in the PBCH in the first SSB.

10. The method according to claim 9, wherein the second information comprises at least one of the following: third information in Master Information Block (MIB), MIB message type indication information, or half-frame indication information;
wherein the third information comprises at least one of the following information: common subcarrier spacing indication information, subcarrier offset indication information, TypeA DMRS position indication information, SIB1 PDCCH configuration information, or a spare bit.

11. The method according to claim 8, wherein the QCL hypothesis indication information occupies 1 bit, or the QCL hypothesis indication information occupies 2 bits.

12. An information transmission method, applied in a network device, the method comprising:
sending a first Synchronization Signal Block (SSB) to a terminal device via a first frequency band, wherein the first frequency band belongs to a first frequency range;
wherein the first frequency range comprises 52.6 GHz to 71 GHz;
wherein subcarrier spacing corresponding to first SSB transmission is first subcarrier spacing; and
wherein:
the first subcarrier spacing is predefined by a communication protocol;
or
the first subcarrier spacing is determined according to an association relationship, and the association relationship comprises an association relationship between subcarrier spacing corresponding to SSB transmission and a frequency band in the first frequency range;
wherein subcarrier offset indication information is carried in a Physical Broadcast Channel (PBCH) in the first SSB;
wherein the subcarrier offset indication information is used to indicate an offset between a subcarrier 0 of a second Common Resource Block (CRB) and a subcarrier 0 of the first Resource Block (RB) of the first SSB in number of subcarriers, a center of the subcarrier 0 of the second CRB coincides with a center of the subcarrier 0 of a first CRB, and the first CRB overlaps with the subcarrier 0 of the first RB of the first SSB.

13. The method according to claim 12, further comprising:
sending, via the first frequency band, first information to the terminal device, wherein the first information is associated with the first SSB;

wherein the first information comprises at least one of the following: System Information Block (SIB) 1, a message 2 or a message 4 transmitted during the initial access procedure, a paging message, or a system message; and wherein subcarrier spacing corresponding to first information transmission is second subcarrier spacing:

the second subcarrier spacing is predefined by a communication protocol;

or the second subcarrier spacing is determined based on at least one of the following information: first subcarrier spacing, the first frequency band, or first indication information; wherein the first subcarrier spacing refers to subcarrier spacing corresponding to first SSB transmission.

14. The method according to claim 12, wherein:

subcarrier spacing corresponding to the subcarrier offset indication information is predefined by a communication protocol;

or, the subcarrier spacing corresponding to the subcarrier offset indication information is equal to first subcarrier spacing;

or, the subcarrier spacing corresponding to the subcarrier offset indication information is equal to second subcarrier spacing;

wherein the first subcarrier spacing refers to subcarrier spacing corresponding to first SSB transmission, the second subcarrier spacing refers to subcarrier spacing corresponding to first information transmission, the first information is associated with the first SSB, and the first information comprises at least one of the following: SIB1, a message 2 or a message 4 transmitted during the initial access procedure, a paging message, or a system message.

15. The method according to claim 12, wherein:

subcarrier spacing corresponding to the first CRB is predefined by a communication protocol;

or, the subcarrier spacing corresponding to the first CRB is equal to the subcarrier spacing corresponding to the subcarrier offset indication information;

or, the subcarrier spacing corresponding to the first CRB is equal to first subcarrier spacing;

or, the subcarrier spacing corresponding to the first CRB is equal to second subcarrier spacing;

wherein the first subcarrier spacing refers to subcarrier spacing corresponding to first SSB transmission, the second subcarrier spacing refers to subcarrier spacing corresponding to first information transmission, the first information is associated with the first SSB, and the first information comprises at least one of the following: SIB1, a message 2 or a message 4 transmitted during the initial access procedure, a paging message, or a system message.

16. A network device, comprising:

a processor; and a memory storing instructions executable by the processor;

wherein when the instructions are executed by the processor, the network device is caused to:

send a first Synchronization Signal Block (SSB) to a terminal device via a first frequency band, wherein the first frequency band belongs to a first frequency range;

wherein the first frequency range comprises 52.6 GHz to 71 GHz;

wherein subcarrier spacing corresponding to first SSB transmission is first subcarrier spacing; and wherein:

the first subcarrier spacing is predefined by a communication protocol;

or the first subcarrier spacing is determined according to an association relationship, and the association relationship comprises an association relationship between subcarrier spacing corresponding to SSB transmission and a frequency band in the first frequency range;

wherein subcarrier offset indication information is carried in a Physical Broadcast Channel PBCH in the first SSB;

wherein the subcarrier offset indication information is used to indicate an offset between a subcarrier 0 of a second Common Resource Block (CRB) and a subcarrier 0 of the first Resource Block (RB) of the first SSB in number of subcarriers, a center of the subcarrier 0 of the second CRB coincides with a center of the subcarrier 0 of the first CRB, and the first CRB overlaps with the subcarrier 0 of the first RB of the first SSB.

17. The network device according to claim 16, wherein when the instructions are executed by the processor, the network device further is caused to:

send, via the first frequency band, first information to the terminal device, wherein the first information is associated with the first SSB;

wherein the first information comprises at least one of the following: System Information Block (SIB) 1, a message 2 or a message 4 transmitted during the initial access procedure, a paging message, or a system message.

18. The network device according to claim 17, wherein subcarrier spacing corresponding to first information transmission is second subcarrier spacing:

the second subcarrier spacing is predefined by a communication protocol;

or the second subcarrier spacing is determined based on at least one of the following information: first subcarrier spacing, the first frequency band, or first indication information; wherein the first subcarrier spacing refers to subcarrier spacing corresponding to first SSB transmission.

* * * * *